United States Patent [19]

Nard et al.

[11] 4,334,314

[45] Jun. 8, 1982

[54] TRANSMISSION OF TIME REFERENCED RADIO WAVES

[75] Inventors: Georges P. Nard; Daniel J. E. Bourasseau, both of Nantes; Jean M. Rabian, Ste-Luce S. Loire, all of France

[73] Assignee: Societe d'Etudes, Recherches et Construction Electroniques Sercel, Carquefou, France

[21] Appl. No.: 37,068

[22] Filed: May 3, 1979

[30] Foreign Application Priority Data

May 9, 1978 [FR] France .................................. 78 13604

[51] Int. Cl.³ .......................... H04B 7/04; G01S 5/06
[52] U.S. Cl. .................................... 375/111; 375/106; 455/65
[58] Field of Search ............... 375/106, 107, 111, 113; 325/56, 301, 305, 304, 307, 370; 455/65, 265; 340/146.1 BE; 343/103, 112 R

[56] References Cited

U.S. PATENT DOCUMENTS

| | | | |
|---|---|---|---|
| 3,213,370 | 10/1965 | Featherston | 325/321 |
| 3,348,152 | 10/1967 | Laughlin, Jr. et al. | 325/305 |
| 3,555,427 | 1/1971 | Hatton | 325/304 |
| 3,604,004 | 9/1971 | Buyer | 325/307 |
| 3,646,443 | 2/1972 | Bickford et al. | 325/307 |
| 3,750,178 | 7/1973 | Hulst | 343/103 |
| 3,783,385 | 1/1974 | Dunn et al. | 325/307 |
| 3,863,257 | 1/1975 | Kang et al. | 343/112 R |
| 4,057,758 | 11/1977 | Hattori | 325/304 |
| 4,101,893 | 7/1978 | Lewis | 343/112 R |
| 4,166,275 | 8/1979 | Michaels et al. | 343/103 |

FOREIGN PATENT DOCUMENTS

881859 11/1961 United Kingdom .

OTHER PUBLICATIONS

*Elements of the ATA Collision Avoidance System*; Shear IEEE Trans. on Aerospace & Electronic Systems; VolAES-4, #2; pp. 295–304, 3/68.

*Primary Examiner*—Marshall M. Curtis
*Attorney, Agent, or Firm*—Schwartz, Jeffery, Schwaab, Mack, Blumenthal & Koch

[57] ABSTRACT

The invention relates to the radio-electrical transmission of accurate timing-mark signals. A space-diversity electrical connection is formed between a station having one single antenna and a station having two antennae and one of the stations is equipped with a receiver device which combines into one composite timing-mark signal the different repetitive timing-marks decoded and rectified from high-frequency signals which have traversed several spatial propagation paths. A common automatic gain control circuit weights the decoded and rectified timing marks according to a weighting which diminishes with the level of high frequency reception. Preferably the rectification of the timing marks is carried out non-linearly.

22 Claims, 16 Drawing Figures

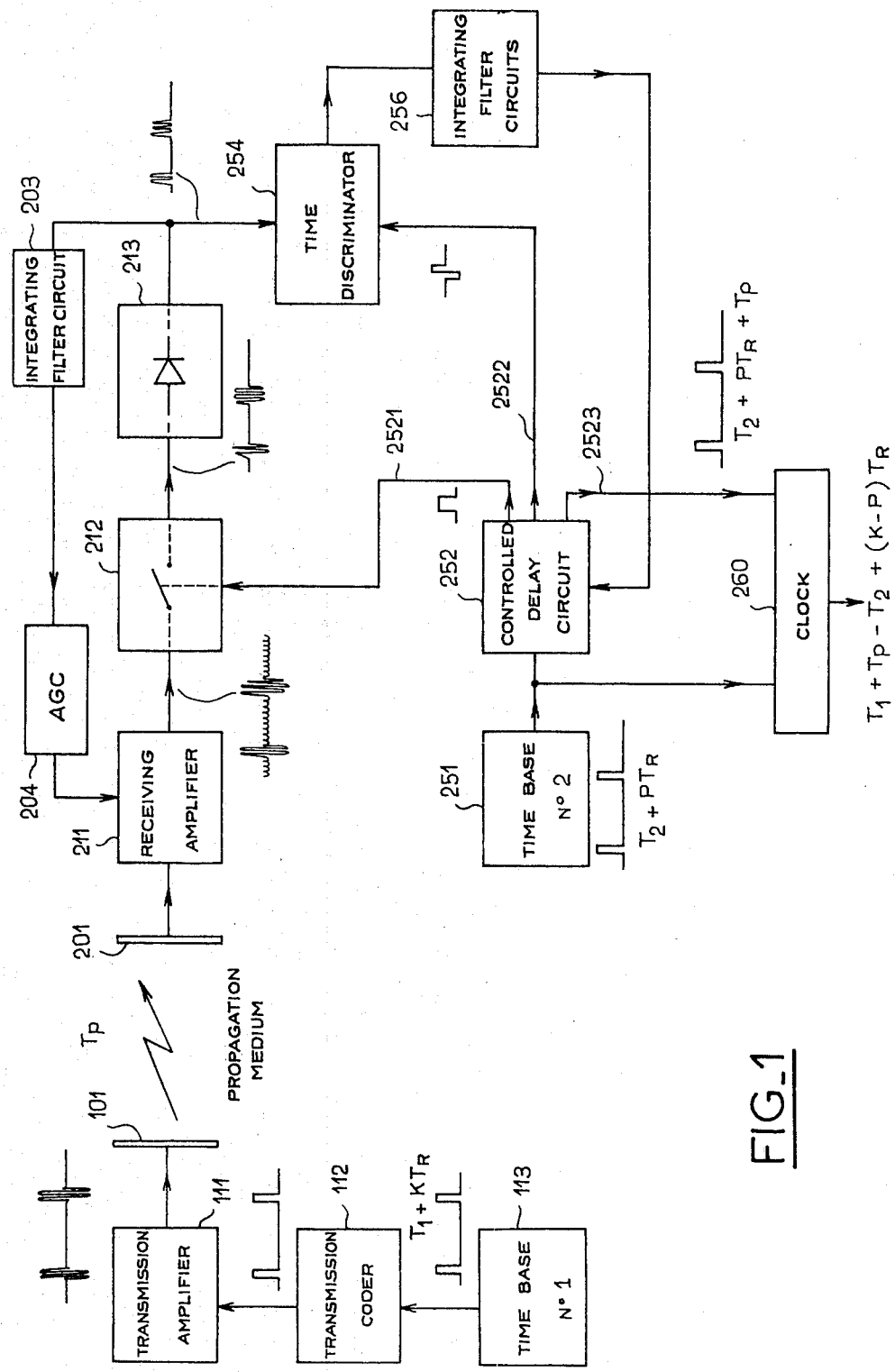
FIG_1

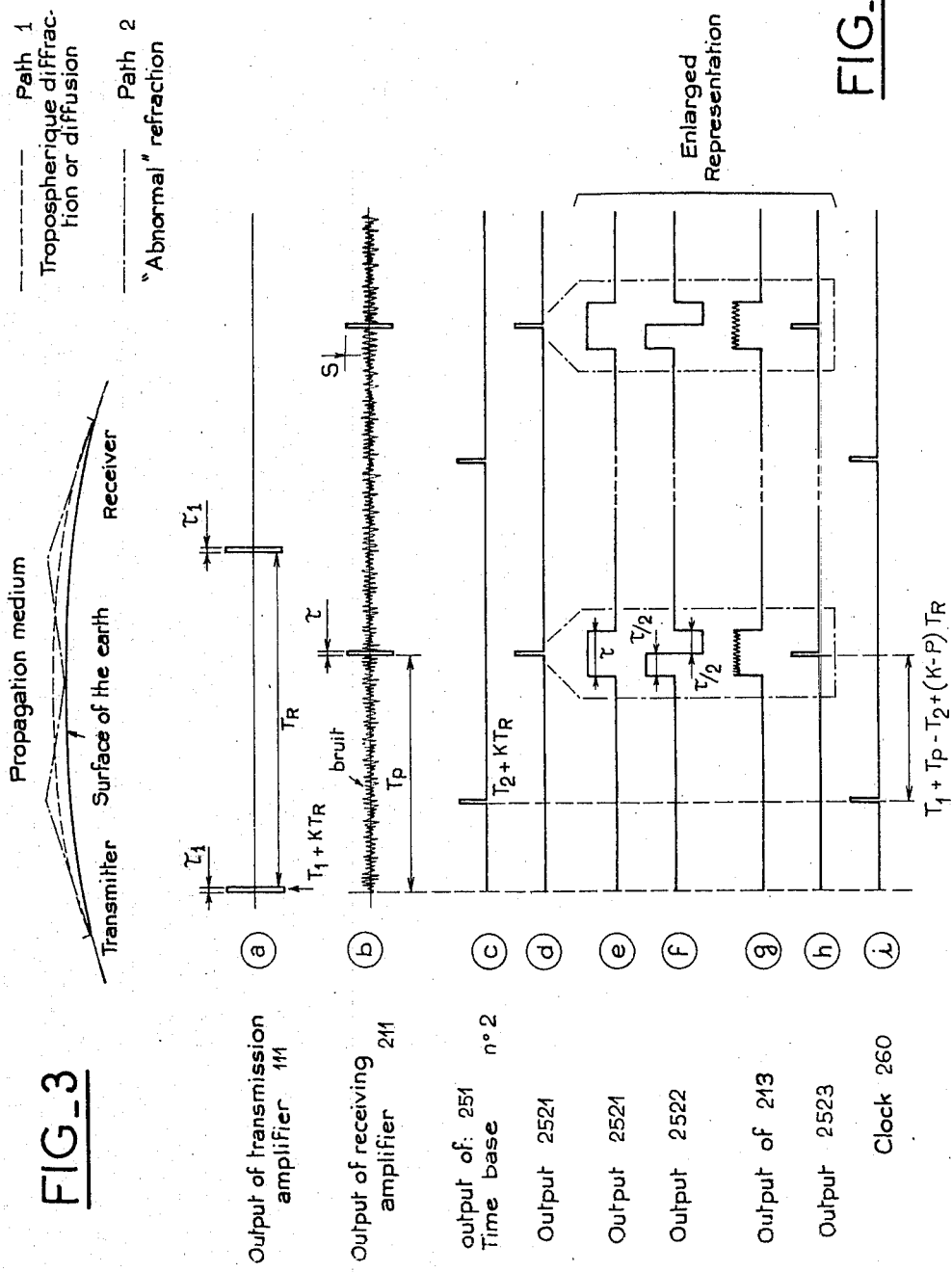

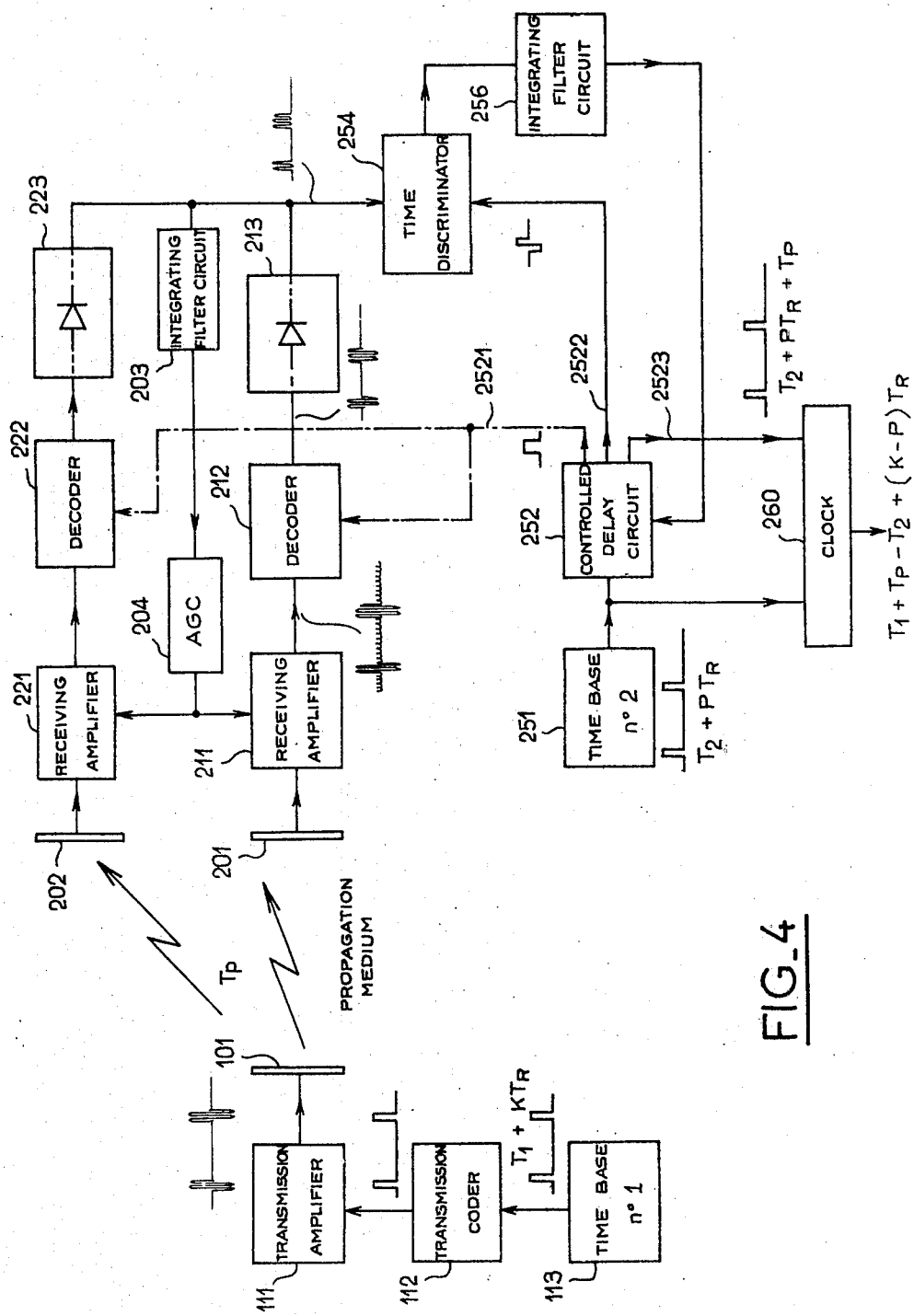
FIG_4

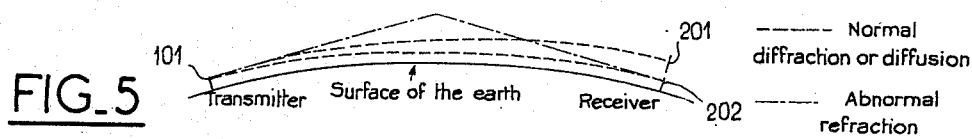
FIG_5
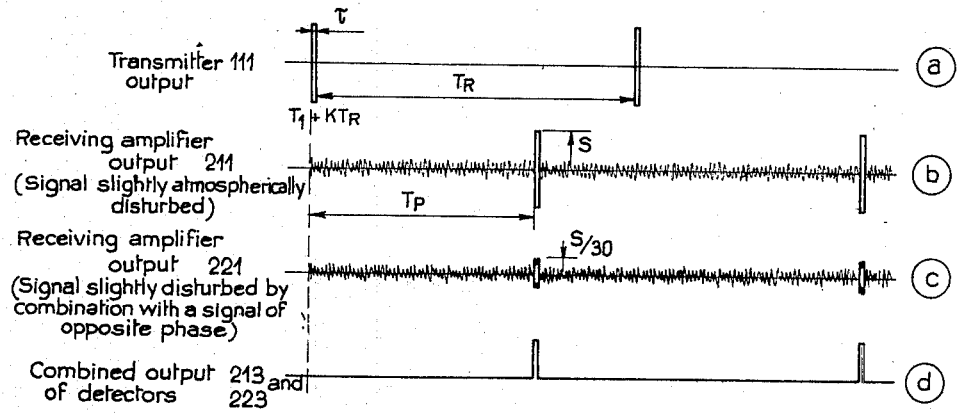
FIG_6
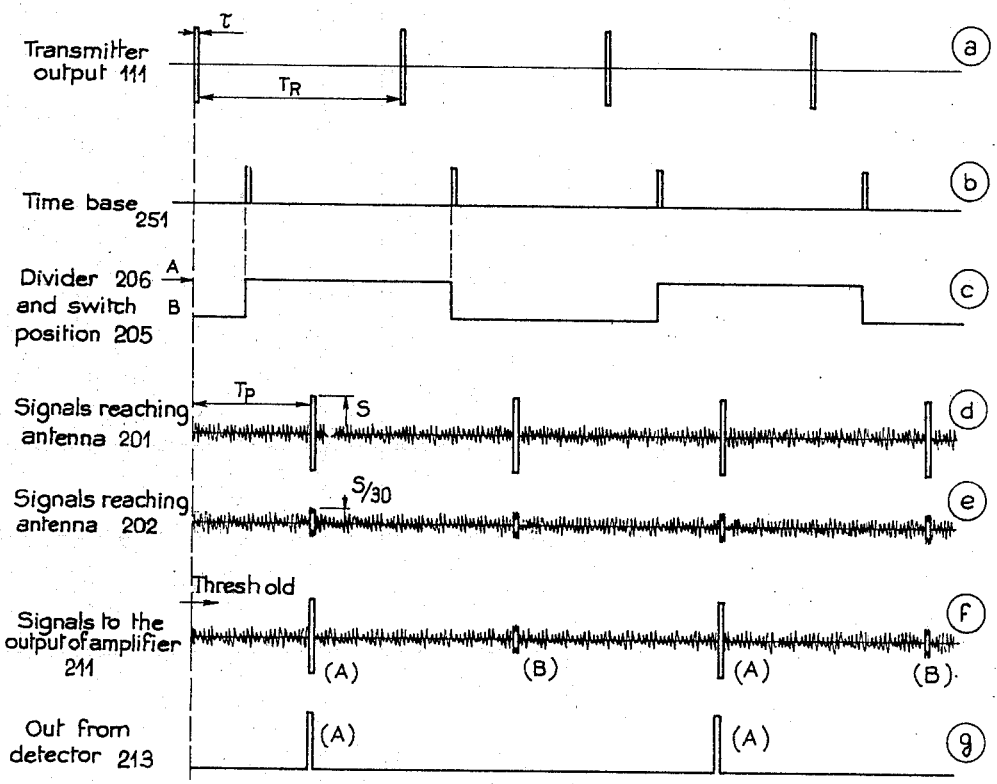
FIG_8

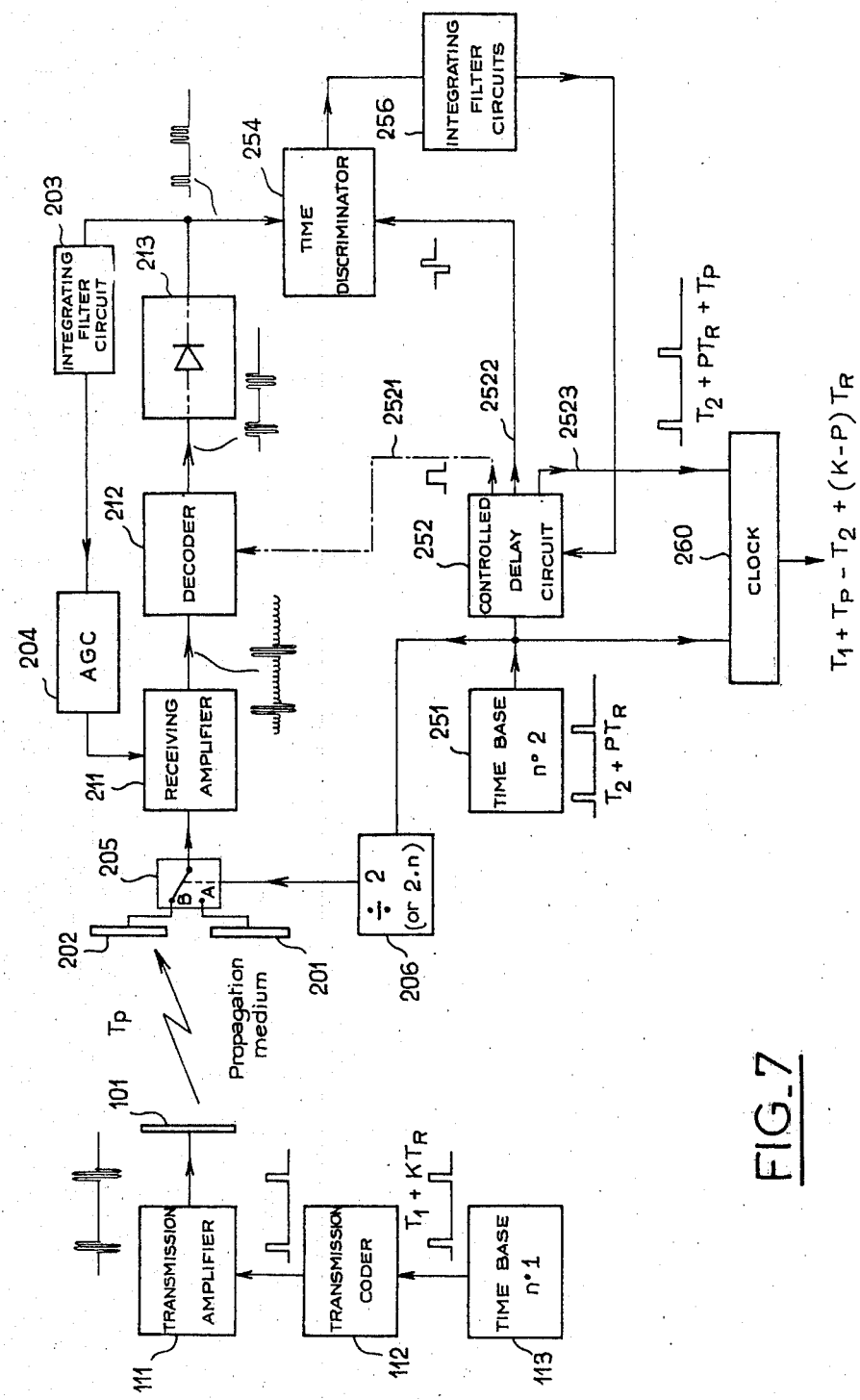
FIG_7

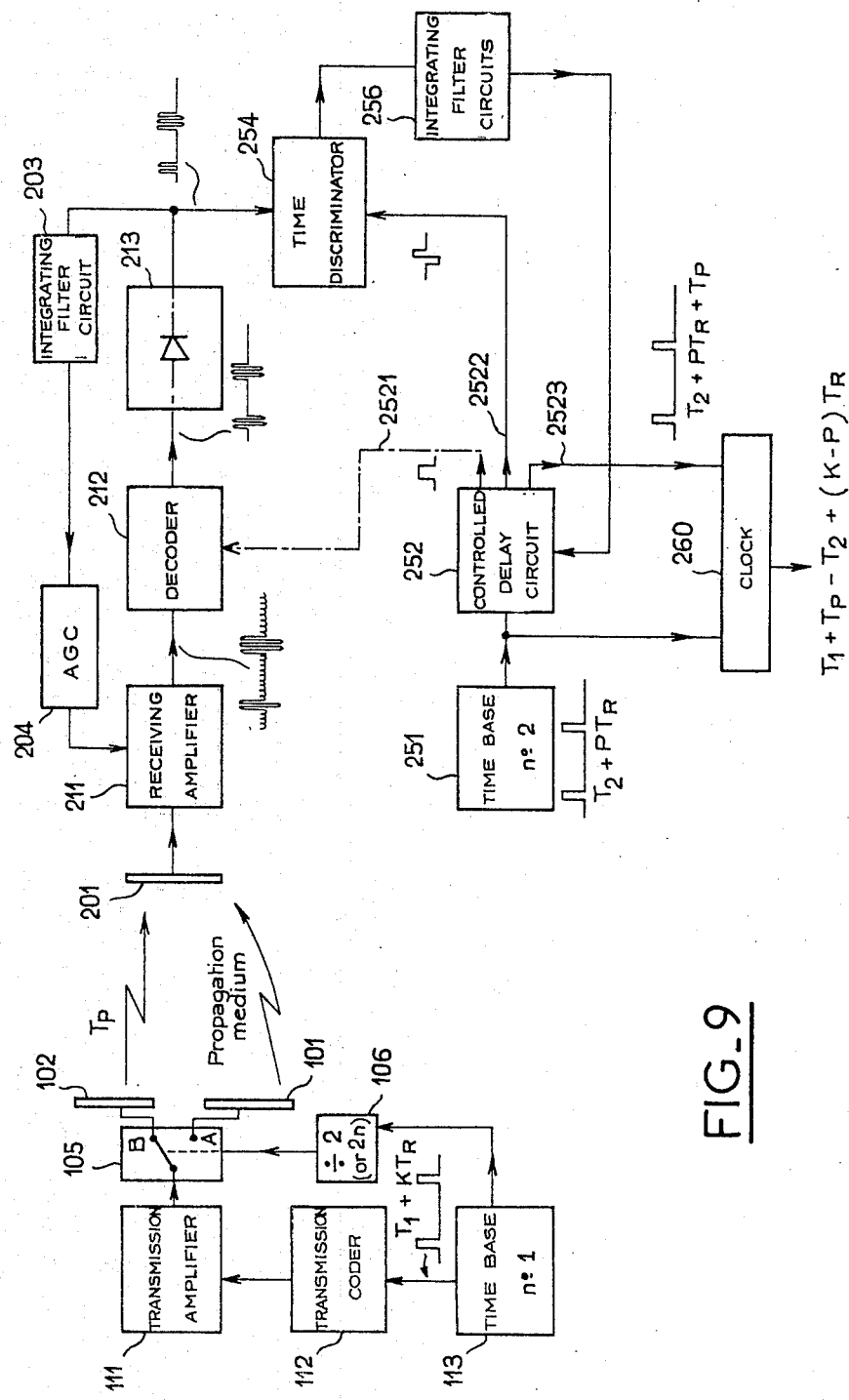
FIG_9

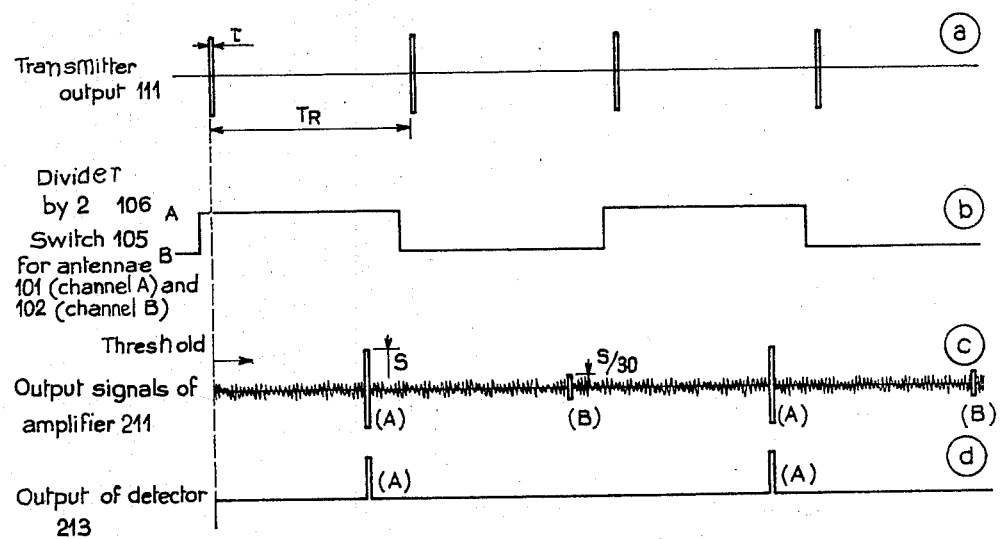
FIG_10
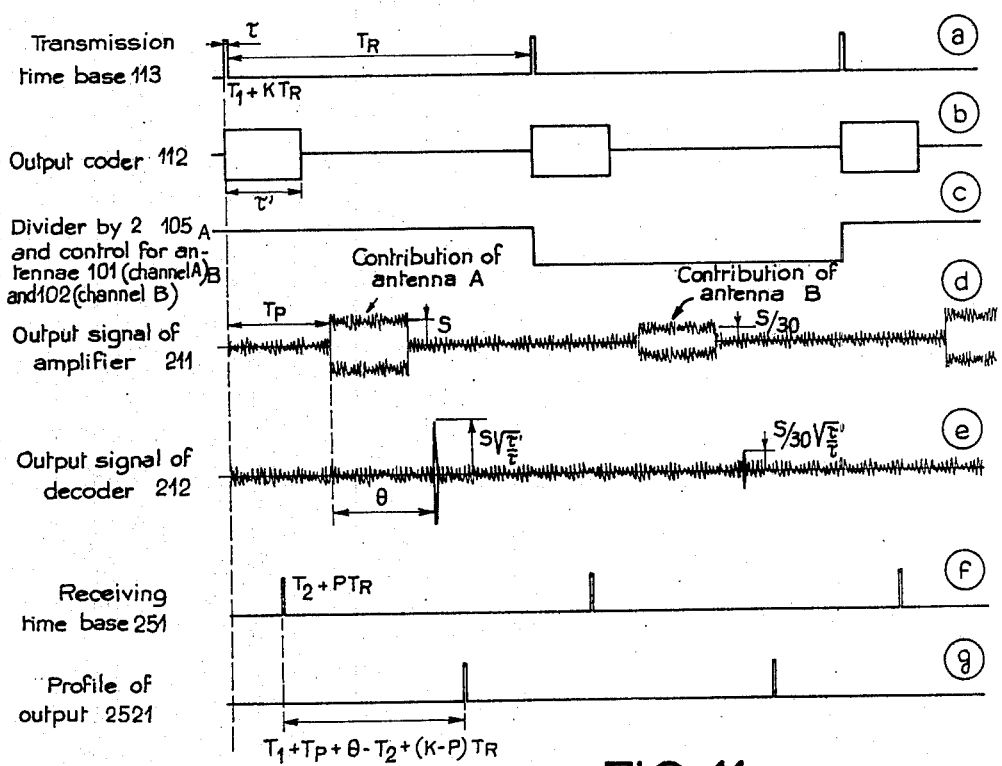
FIG_11

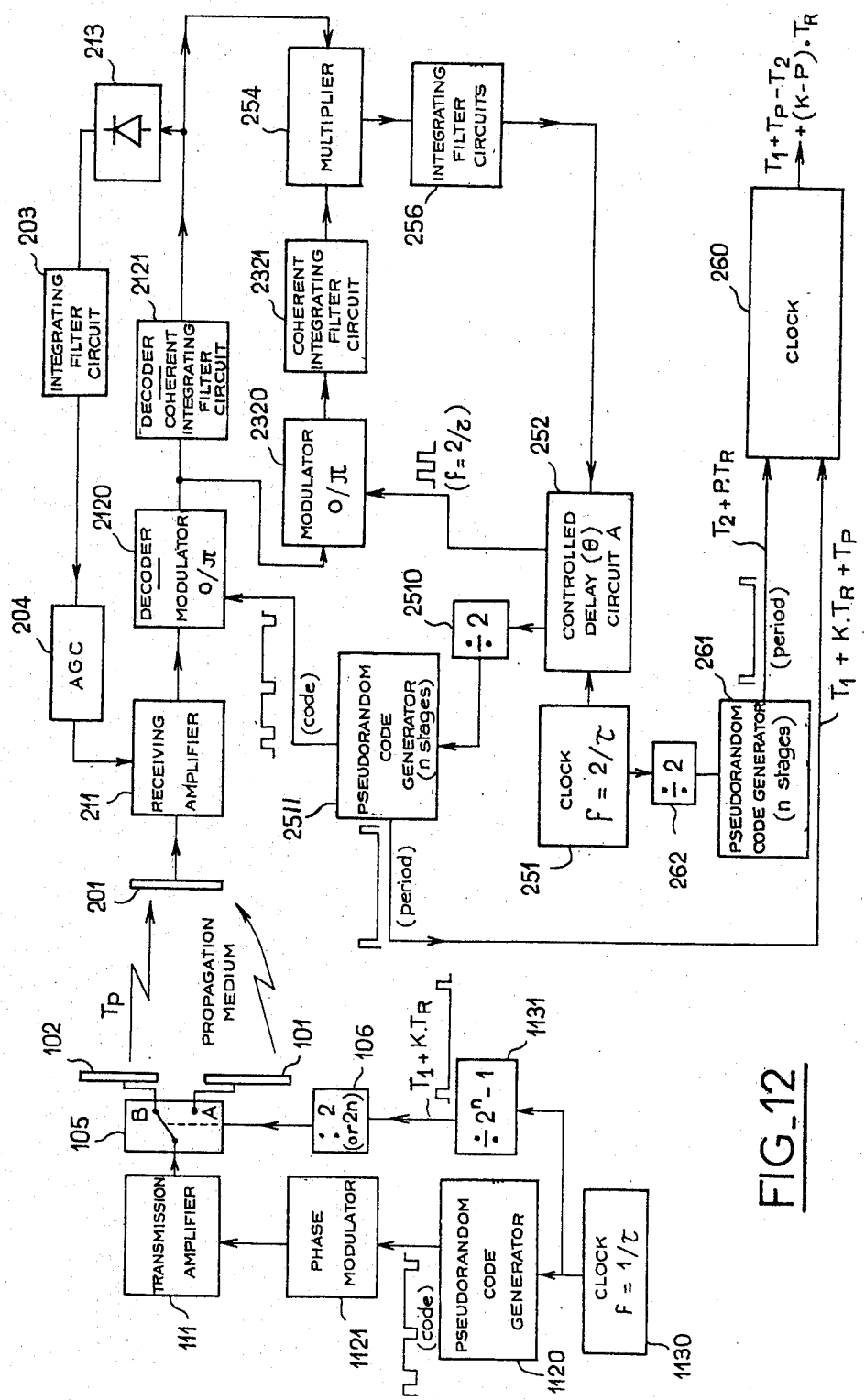
FIG_12

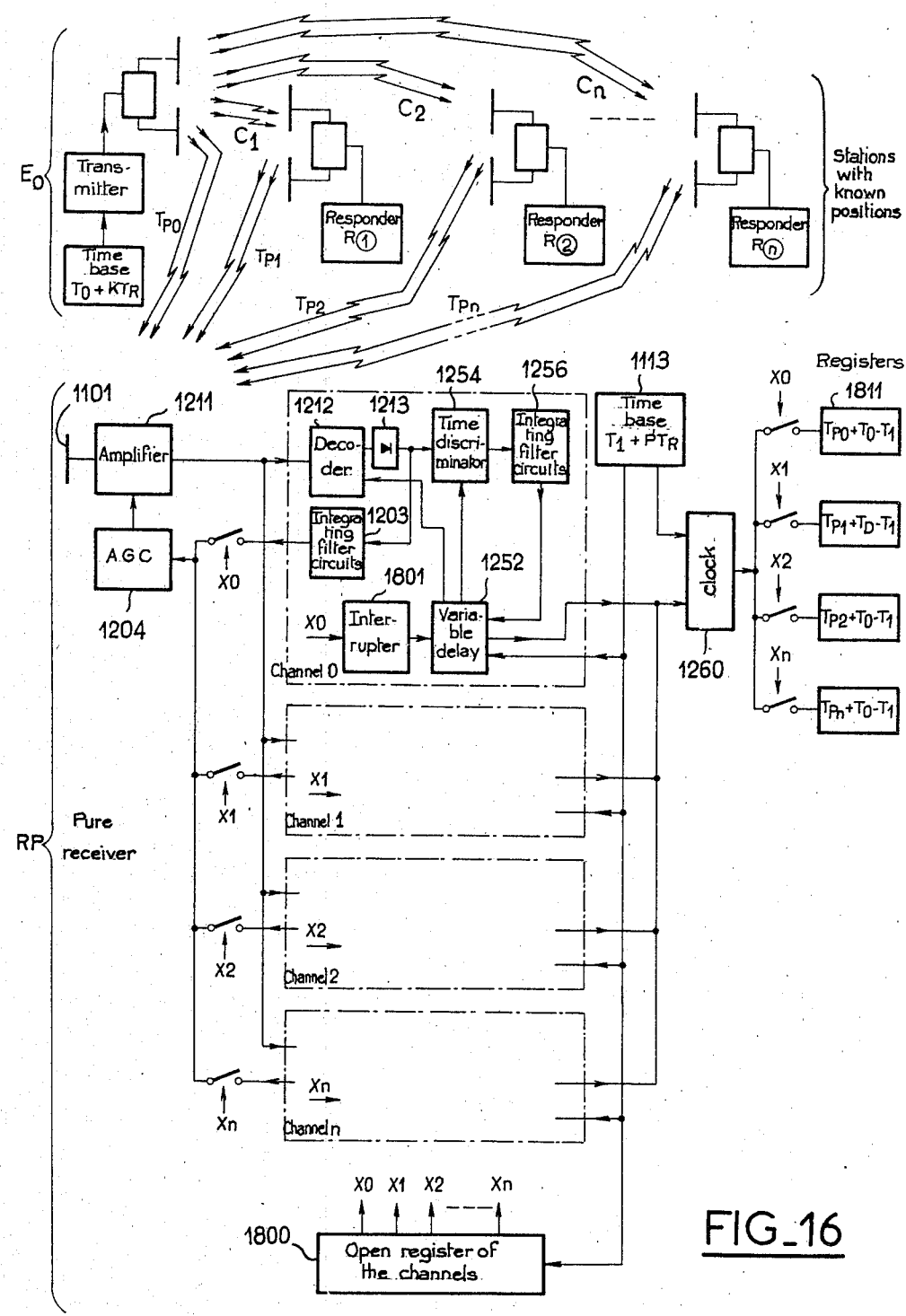
FIG_16

TRANSMISSION OF TIME REFERENCED RADIO WAVES

The invention refers to the radio-electrical transmission of accurate timing-mark signals. It is aimed more particularly at a terrestrial transmission beyond the horizon and even very much beyond the horizon.

Installations are already known for the radio-electrical transmission of a signal forming a timing mark. In these a radio-electrical connection is defined between two antennae spaced apart. A transmitter applies to one of the antennae a high-frequency electrical signal coded according to a repetitive timing mark—for example, short synchronous high-frequency pulses from a time base. Corresponding waves are propagated between the two antennae. And a receiver coupled with the second antenna receives the high-frequency signals like the transmitted signals and decodes from them the timing-mark.

For the majority of the time the radio-electrical connection is terrestrial, that is to say, the two antennae are located at two different points on the surface of the earth (continents or oceans).

In order to transmit a very accurate timing-mark it is necessary to employ a very wide frequency spectrum and consequently to operate at high-frequency (VHF or UHF, for example). Known installations of this species operate well insofar as the distance between the two antennae remains less than a limiting value, which depends particularly on the height of the antennae above the surface and as one refers customarily to the distance of the horizon seen from the transmitting antenna.

On the other hand for radio-electrical connections of a length greater than twice the distance of the horizon (for the majority of the time about 150 km), anomalies of propagation appear. These are manifested by a multiplicity of distinct times of propagation for the waves and by the reception of high-frequency signals of comparable amplitudes which may lie in phase opposition. Under such conditions conventional timing-mark transmission installations cannot operate correctly for reasons which will be considered in detail later.

The practice is furthermore known of employing long-distance radio-electrical connections in telecommunications because the transit time is of little importance in this type of application. One current solution consists in providing a radio-electrical connection with space-diversity, that is to say, it includes a number of antennae at one end of it at least, these being antennae which define a number of different global propagation paths. At the receiver this solution makes use of both or either of the following arrangements:

switching of the antennae in order to retain only that which gives a suitable signal at a given instant;
coherent summing of the high-frequency signals received at the various antennae or of intermediate frequency signals which are deduced from them.

The expression "coherent summing" signifies that the phase of each of the signals is shifted in order to bring them to the same phase at high-frequency (phase subjection) and only to add them afterwards.

These conventional arrangements of transhorizon telecommunication connections have not been able to be employed when it is a question of transmitting a timing-mark. In short they do not enable a sole and stable propagation time to be defined to which the receiver can be subjected.

The present invention offers installations for radio-electrical transmission of signals forming a timing-mark, these being installations which operate beyond and even very much beyond the horizon, for example, as far as 3 to 10 times the distance of the horizon. The installations of the invention make use of a space-diversity radio-electrical connection but in a different way from that which has been employed hitherto in telecommunications.

The basic structure of the installation of the invention is the same as that of conventional installations for the transmission of a timing-mark: the installation comprises a first and a second antenna station spaced apart and capable of cooperating by wave means in order to define a radio-electrical connection; a transmitter device coupled to the first antenna station is capable of applying to it a high-frequency electrical signal coded according to a repetitive timing-mark in order to transmit corresponding waves; and a receiver device coupled to the second antenna station is capable of receiving the high-frequency signals like the signal transmitted as well as of decoding from them the repetitive timing-mark.

In accordance with the invention the radio-electrical connection is of space-diversity type: one of the antenna stations comprises at least two antennae spaced apart in order to define for the waves at least two different propagation paths. And the receiver device combines into one composite timing-mark signal the different repetitive timing-marks decoded and rectified from the high-frequency signals which have traversed the several propagation paths.

The difference from transhorizon telecommunication installations is evident: the composite signal is obtained after decoding and rectifying by a non-coherent rearrangement, taking no account of the phase of the high-frequency signals received. One no longer tries by switching of antennae to select one high-frequency signal received amongst many; on the contrary, the different decoded timing-marks are systematically combined.

The receiver device very advantageously weights the decoded timing-marks according to a weight which diminishes with the level of high-frequency reception over the propagation path from which they arise.

For the majority of the time in practice the receiver device includes a circuit for variable-gain selective amplification of the incident high-frequency signals. In accordance with the invention the variable gain is defined according to the crest amplitude of the decoded and rectified timing-marks. The weighting in accordance with the invention is realised by the fact that the receiver device defines a common variable gain for all of the high-frequency signals received, independently of their propagation paths, from the crest amplitude of the composite timing-mark signal. The result is a weighting of the decoded timing-marks as a function of the level of the high frequency signal from which they have arisen, hence according to the propagation path of the wave which has produced each high-frequency signal.

The difference with respect to transhorizon telecommunication installations is clear: instead of sorting out the signals received according to their amplitude and-/or their phase at high frequency, reference is made to the crest amplitude of the composite signal obtained after decoding and rectifying. By doing this one takes into account the timing-mark of greatest amplitude—after weighting and decoding—amongst the distinct different timing-marks which the composite signal possibly contains.

The variable-gain control applied in common to the high-frequency signals received advantageously includes a predetermined time constant chosen to be greater than the average time interval for autocorrelation of the anomalies observable in transhorizon propagation.

In accordance with another important characteristic of the invention the receiver device includes downstream of the selective amplification circuit a non-linear member which is usually the rectifier. This member applies a non-linear characteristic to the timing-mark signals so as to reduce again the weight attached to those which correspond with low amplitudes of the high-frequency signal. With installations in accordance with the invention the Applicants have obtained over transhorizon connections much better results than with installations of the former technology. Thus installations in accordance with the invention working with decimetric waves have operated as far as maximum distances lying between three and ten times the distance of the horizon.

These good results which are still not completely explained seem largely due to the following two facts observed by the Applicants: the combination of the shortest transhorizon propagation path with that or those which result from important secondary responses—heavy refraction in particular—leads to disturbances of amplitude and propagation time which are strongly correlated between them; again, a very rapid spatial decorrelation of the waves received is apparent especially when the effect of the disturbances is a maximum—phase opposition (on the theoretical plane this corresponds with a random deformation of the wave plane).

Furthermore timing-mark signals can now be transmitted with a high-frequency energy sufficiently large to enable their reception very much beyond the horizon in spite of the considerable attenuation which is then undergone by the waves.

It is very advantageous for this purpose to employ a coding of the timing mark which enables the energy transmitted to be distributed in time, in particular a pulse compression code or better still a pseudo-random code.

Thus the invention enables a timing-mark transmission which is both trustworthy (measurement possible under all circumstances), reproducible on long term, and stable on short term. This is obviously fundamental in measuring time of propagation or distance.

Other characteristics and advantages of the invention will become apparent from reading the detailed description which is to follow, made with reference to the drawings attached in which:

FIG. 1 illustrates a timing-mark transmission installation in accordance with the former technique;

FIG. 2 illustrates the wave forms at different points of the installation as FIG. 1;

FIG. 3 illustrates a normal path and a disturbed path between a transmitter and a receiver;

FIG. 4 illustrates a first embodiment of an installation in accordance with the invention;

FIG. 5 illustrates a space-diversity connection between a transmission antenna and two reception antennae, with a normal path onto one antennae and a disturbed path onto the other;

FIG. 6 illustrates wave forms taken at different points of the installation as FIG. 4;

FIG. 7 illustrates a variant upon the space-diversity by switching antennae in the receiver of the installation;

FIG. 8 illustrates wave forms taken at different points in the installation as FIG. 7;

FIG. 9 illustrates another variant upon the space-diversity connection by switching antennae in the transmitter of the installation;

FIG. 10 illustrates wave forms taken at different points in the circuit as in FIG. 9 in the case of a timing-mark coding by short high-frequency pulses;

FIG. 11 illustrates wave forms taken at different points in the circuit as FIG. 9 in the case where the timing-mark is transmitted by a pulse-compression code;

FIG. 12 illustrates an embodiment of the invention in which the space-diversity is of the type as FIG. 9 and in which the timing-mark is represented by a pseudo-random code;

Figure 15:
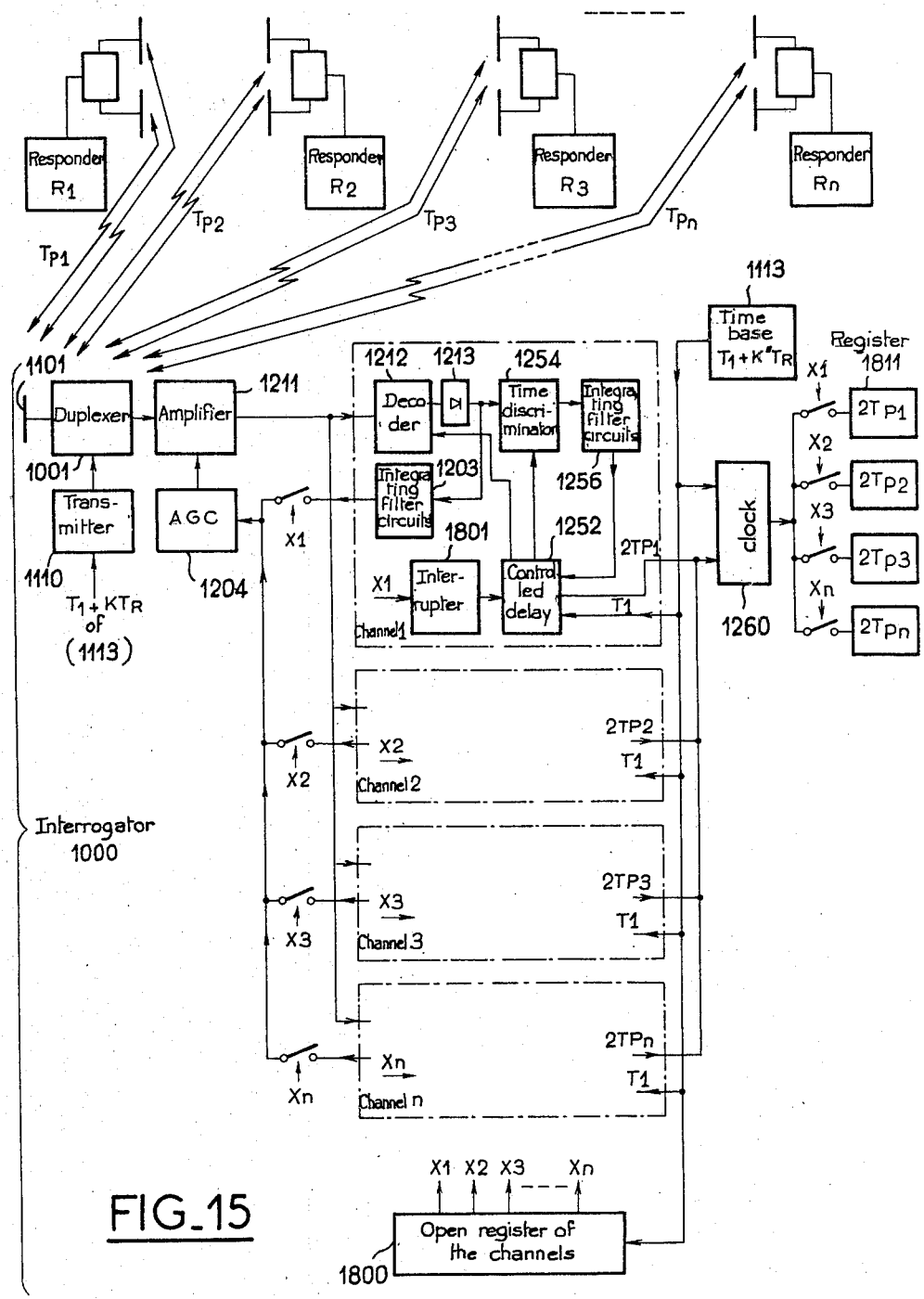

FIG. 15 illustrates an application of the invention to the measurement of distances between an interrogator and a number of responder (determination of position in circular radio-navigation); and FIG. 16 illustrates an application of the invention to the measurement of the distance between a movable receiver and fixed stations comprising a transmitter and a number of responder (determination of position, for example, by radio-navigation in the hyperbolic mode).

I—FORMER TECHNIQUE

In order to define better the technical field of the present invention an example will first of all be described by reference to FIGS. 1 to 3 of an installation according to a former technique.

A first antenna station 101 and a second antenna station 201 are equipped each with one single antenna. They are spaced apart and can cooperate by wave means in order to define a radio-electrical connection.

A transmitter device coupled to the antenna 101 includes a transmission amplifier 111 preceded by a coding circuit 112 which in turn receives the signals from a first time base 113. The time base 113 transmits pulses of period $T_R$. If $T_1$ designates the instant of appearance of one of the pulses the others will be separated from it by a whole number K, positive or negative, of periods $T_R$. Thus the time base 113 defines a repetitive timing-mark which will be written $T_1 + K.T_R$.

The transmission coding circuit 112 has the duty of cooperating with the transmission amplifier 111 in order to apply to the antenna 101 a high-frequency electrical signal coded according to the repetitive timing-mark $T_1 + K.T_R$. In FIG. 1 the coding consists in making a powerful and short pulse of purely high-frequency correspond with each pulse supplied by the time base 113 or to only certain of them. FIG. 2a shows the pulses transmitted (here and in what follows, the high-frequency included in the pulses is not represented in order to simplify the drawing).

The high-frequency signal which carries the timing-mark is transformed by the antenna 101 into waves which are propagated through a propagation medium towards the antenna 201. Because of the time of propagation of the waves a delay $T_p$ is found to be applied to the timing-mark which they carry, when they arrive at the antenna 201.

The antenna 201 is coupled to a receiver device which comprises first of all a selective receiving amplifier 211 which passes a band like that which has been chosen for the transmission. The output from the amplifier 211 supplies high-frequency pulses delayed by $T_p$ with respect to the pulses transmitted (FIG. 2b). The amplifier 211 is followed by a decoder circuit 212 consisting here of a simple switch (for the case of coding by short pulses), followed in turn by a detector circuit 213 comprising, for example, a rectifier diode.

Furthermore in the receiver a time base 251 defines recurrent pulses written $T_2+P.T_R$. Their period $T_R$ is the same as at the transmitter (FIG. 2c). But the other characteristics $T_2$ and P of the timing-mark so defined at the receiver have no reason for being identical with those of the transmitter.

A controlled delay circuit 252 produced different forms of pulses shifted in phase by the same variable delay as the pulses of the time base 251. An output 2521 from this circuit supplies pulses of the same duration as the transmitted high-frequency pulses. FIG. 2d illustrates the form of these pulses on the time scale of FIGS. 2a to 2c. FIGS. 2e, 2f and 2h give enlarged representations corresponding with the outputs from the circuit 252, while FIG. 2g gives an enlarged representation corresponding with the output from the detector 213.

The decoder 212 is here a simple switch which carries out a correlation between the high-frequency pulse received (FIG. 2b) and the output 2521 from the delay circuit 252. Insofar as the delay is suitably adjusted the correlation is total, the two signals coincide and hence the decoder lets pass the whole of the high-frequency pulse received and suppresses the noise present between the pulses. Otherwise a portion of the high frequency pulse received is removed because the closure of the switch 212 does not coincide exactly with this pulse. After that the detector 213 rectifies the whole or the remaining portion of the high-frequency pulse received, as the case may be.

Initially in a pick-up phase the delay in the circuit 252 is made to vary rapidly until a signal is obtained at the output from the detector 213. After that the delay is adjusted finely.

For this purpose the output from the detector 213 (FIG. 2g) is applied of one input to a time discriminater 254. In one embodiment the latter receives as its other input a bipolar signal supplied by the output 2522 from the circuit 252. This bipolar signal (FIG. 2f) has a negative portion followed by a positive portion, symmetrical with one another. The transition between them coincides with the centre of the signal given by the output 2521. The time discriminator multiplies the output from the detector 213 by the bipolar signal 2522. Hence the output from the time discriminator will be positive or negative according to whether the rectified pulse leaving the detector 213 is late or early with respect to the output from the delay circuit 252. It will be zero in the case of exact coincidence.

The negative or positive signals thus obtained are applied to an integrating filter circuit 256 which controls the delay in the circuit 252 and forms with it a delay correction loop. The circuit 256 comprises, for example, two consecutive stages of filtration in order to achieve a second order filtration, one of these filters (often the first) being corrected so as to avoid instabilities in the delay correction loop. In that way the delay in the circuit 252 is permanently corrected as a function of the high-frequency pulses received. The result is at the output from the delay circuit (output 2523, FIG. 2h) a timing mark synchronous with that from the transmitter but shifted in phase by the propagation time $T_p$ and written $T_1+T_p+K.T_R$.

For the majority of the applications a clock circuit 260 is connected between the output from the time base 251 and that from the controlled delay circuit 252. The separation in time measured by the clock 260 is given by the expression:

$$T_1+T_p-T_2+(K-P).T_R.$$

In this expression the period $T_R$ is known. K and P are a priori any whole numbers but it is in general known how to determine the difference between them (methods of removing ambiguity, for example).

In measuring distance one often knows $T_1-T_2$, and one is looking for the propagation time $T_p$ in order to measure the distance from transmitter to receiver. A number of measurements made between more than two points furthermore enables the distance to be determined by eliminating the term $T_1-T_2$ if it is unknown.

In a time measurement application which can be envisaged as the main purpose ($T_p$ known) or in complement to the foregoing, the separation $T_1-T_2$ between the two timing-marks is measured in order to have available the same time reference at the transmitter and the receiver.

In an installation such as that in FIG. 1 the amplifier 211 is in general equipped with an automatic gain control. It may be seen that the output from the detector circuit 213 consists of rectified pulses which already form a timing mark signal. The amplitude of these pulses is proportional to the amplitude of the high-frequency signal present at the output from the receiving amplifier 211. Hence the output from the detector circuit 213 is the input signal to the automatic gain control chain which starts with an integrating filter circuit 203 the duty of which is to determine the amplitude of the pulses. This integrating filter circuit 203 is followed by an automatic gain control circuit 204 which controls the gain of the receiving amplifier 211 so that the amplitude of the pulses detected remains in the vicinity of a reference level chosen for optimum reception of the strongest high-frequency pulses.

Such a timing-mark transmission installation has a limited "separating power" the fineness of which is proportional to the width of the band of transmission and reception. In order to transmit a timing-mark suitably it is first of all necessary that the receiver be able to determine a propagation time which is stable and unique at least within its separating power, and of course that the useful high-frequency signal which it receives can be distinguished from the noise.

The achievement of these two imperatives is largely dependent upon the modes of propagation of the waves. The wave propagation is generally the same for frequencies higher than 30 MHz and the analysis which is made of it below is applied by way of example to metric, decimetric and centimetric waves (30 MHz to 30,000 MHz).

In the field of propagation distances running up to 1.5 to 2 times the distance from the transmission antenna to its geographical horizon, or about 100 km, installations of the former technique in general operate well. In this first field one distinguishes the zone located on this side of the horizon where the propagation is effected in line of sight, then a zone located up to 1.2 times the distance of the horizon where the propagation is due to the normal refraction of the waves by the atmosphere and finally a diffraction zone or "shadow" zone where the propagation offers substantially the same characteristics (FIG. 3, path 1) but where the level of the waves received is strongly attenuated with distance.

In this first field the ground can be reflection produce interference but the differences in path which result from it are small and do not cause important scattering of the propagation time of the waves to appear (it will be recalled that the propagation time results from the combination of an infinity of elemental paths, whence the possibility of its scattering).

Casual reflections (especially reflections in the vicinity of the antennae) may produce a secondary propagation path whence a secondary propagation time results, differing from the normal time. But that is rather rare and the separating power of the receiver is often sufficient to eliminate the secondary path. Hence users can in general put up with the short times of unavailability of the installation which result from it.

Beyond twice the distance to the horizon starts a second field where the installations of the former technique often operate less well because this second field associates a basic propagation ("tropospheric diffusion") which is still usable, with abnormal and discontinuous propagation effects (heavy tropospheric refraction or "super refraction") which may be frequent in certain regions and in certain weather.

Beyond twice the distance to the horizon the tropospheric diffusion (FIG. 3, path 1) takes the lead over the effect of diffraction. This is exhibited as a level of the waves received which is subject to rapid fluctuations and relatively stable in the long term. However, the propagation time undergoes a random scattering, substantially Gaussian, which increases with distance. The conventional installations can still operate under these conditions, contingent upon suitable filtration of the noise associated with the propagation time. But on the other hand a loss appears, on the average, of the energy which can be employed for acquiring the propagation time corresponding with the path with which the time tracking loop is in step.

As soon as they are added to the tropospheric diffusion the abnormal effects (FIG. 3, path 2) define a second propagation time, in general longer, and cause a considerable supplementary contribution to the amplitude of the waves received, which is called a "secondary response".

The conventional installations are generally overflowed by these secondary responses; very often their separating power does not allow them to distinguish the main response from the secondary response in order to eliminate the latter. And very frequently the two responses arrive in phase opposition (as regards the high frequency signal); the receiver then "sees" a grossly erroneous propagation time, where the error may be bigger than the separation between the propagation times of the two responses. (This phenomenon tends to be further aggravated by the receiving automatic gain control). Again, if the disturbance is persistent the propagation time tracking device will fall out of step with the normal propagation time and subsequently lose a substantial time in finding it again.

Hence in the face of these difficulties the conventional installations do not give absolute satisfaction.

On the contrary the installations in accordance with the invention give much better results in the presence of secondary responses (multiple paths), whether it is a question of tropospheric refraction at long distance or even of casual reflections at shorter distance. Moreover they function better in the zone of tropospheric diffusion even in the absence of disturbances.

II—FIRST EMBODIMENT OF THE INVENTION

FIG. 4 illustrates a first embodiment of the invention. It includes numerous parts like those in FIG. 1, which keep the same reference number and will not be described again.

In accordance with the invention the receiver includes a second antenna 202 separated from the first by about 15 (201) to 30 wavelengths of the carrier high-frequency. With this second antenna 202 is associated a second reception channel which includes like the first a selective receiving amplifier circuit 221, a decoder circuit 222, and a rectifier circuit 223. And the outputs from the two rectifier circuits 213 and 223 are joined, thus combining the signals received over the two apparent paths defined between the transmission antenna 101 and the two receiver antennae 201 and 202 respectively.

The composite timing-mark signal thus obtained is applied to a propagation time tracking loop generally like that in FIG. 1 (parts 251, 252, 254 and 256). This tracking loop will be realised in practice by means of analogue integrators or counting-scale integrators, analogue or numerical dephasers, oscillators controlled in frequency or in phase with the analogue or numerical signal, or any equivalent means, especially numerical calculation algorithms equivalent to the wired numerical chain comprising integrators, a dephaser, and an oscillator or time base.

The respective connections between the antennae 201,202 and the amplifiers 211, 221 must be of the same length so as to present the same delay time (possibly to the nearest whole multiple of the period of the timing-mark). Similarly the delay times in the amplifiers 211, 221 and the decoders 212, 222 must be the same.

The gains of the two receiving amplifiers 211 and 221 are very advantageously controlled in an identical way by a single automatic gain control chain—integrating filter circuit 203 and gain control circuit 204—connected to the common output from the detector circuits 213 and 223 in order to receive from them the composite timing-mark signal. The integrating filter circuit 203 determines the crest value of the composite signal and it stores it with a time constant which is necessarily at least equal to the period $T_R$ of the time base. This time constant (for the increase of the gain) is moreover chosen to be greater than the average time interval of autocorrelation of the disturbances of level due to the tropospheric refraction. In practice the Applicants have found that this time constant should be greater than about 15 seconds.

The result is in general that the decoded timing-marks become weighted as a function of the level of the high-frequency signal from which they have arisen.

Reference will now be made to FIG. 5 which illustrates an example of conditions of propagation between the transmission antenna 101 and the receiving antennae 201 and 202.

In this example, which corresponds with a frequently occurring situation, the antenna 201 receives only waves which have undergone a normal diffraction and/or diffusion; the antenna 202 receives the same waves increased by a secondary response due to tropospheric refraction (or to refraction over an obstacle). And the combination of the two in phase opposition is shown by a collapse of the high-frequency signal at the output from the amplifier 221. That is illustrated in FIG. 6 in the case of time coding by simple high-frequency pulses. The pulses transmitted are shown diagrammatically in FIG. 6a, and FIGS. 6b and 6c show respectively the outputs from the amplifiers 211 and 221: it is seen that the output signal from 221 is 30 times less than that from the amplifier 211 (although the scale of FIG. 6 does not enable it to be shown, the two output signals are shifted in time). After the decoding switches have eliminated the noise the combined output from the detectors 213 and 223 joins the two signals into a single timing-mark signal consisting essentially of the stronger of them (FIG. 6d).

In accordance with an important aspect of the invention a non-linear rearrangement is thus achieved of the timing-marks received: in fact the diodes incorporated in the detectors 213 and 223 have a threshold and non-linear response which contributes greatly to favouring the stronger signals. In practice it will be arranged that the weak signals (for example, 1/30 of the strong signal) are completely eliminated by the non-linear element incorporated in the detectors 213 and 223. This may be achieved for certain by putting after the detector circuit an impedance separator or isolator and rearranging the outputs from the two detector circuits by means of an "analogue OR" circuit enabling the signal the level of which is higher to be practically the only one perceivable at the output.

The rearrangement of the timing-marks received is likewise non-coherent, since it does not take into account the phase of the high-frequency signals received.

The composite signal obtained after this non-linear and non-coherent rearrangement is employed as the input to the automatic gain control chain. Consequently the relative proportions of the two signals received (FIGS. 6b and 6c) will not be modified by the automatic gain control since only the stronger of them is taken into account for regulating the gain.

And if it happens that the two signals are disturbed at the same time, the automatic gain control will wait before increasing the gain (because the time constant is longer than the average interval of time for auto-correlation of the disturbances of level).

Thus a weighting of the timing marks is preserved as a function of the amplitudes of the high-frequency signals from which they have arisen.

Whereas it has proved necessary to make a non-linear rearrangement of the timing-marks received for the automatic gain control the Applicants have observed that one can employ a linear (but not coherent) rearrangement of the timing-marks received for feeding the time tracking loop. Such a linear rearrangement corresponds with pure rectification. Nevertheless it is at present considered preferable to employ also for the time loop a non-linear rearrangement such as that which is allowed by the characteristics of the diodes or by an analogue-OR circuit. In fact such a non-linear rearrangement diminishes further the weight assigned to the timing-marks received over a low level of high-frequency signal.

Thus in FIG. 4 it is the common output (non-linear) from the detector circuits 213 and 223 which serves as input both to the automatic gain control chain and to the time tracking loop.

The advantages of the arrangement in accordance with the invention may be explained as follows:

(1) When normal refraction does not exist in the tropospheric diffusion zone the signals which reach the receiving antennae are the object of a fluctuation in amplitude, of a scattering of the propagation time, as well as of a fluctuation in the angles of incidence of the waves which compose them. A deformation likewise appears of the "plane" forming the "wave front" and consequently a rapid spatial decorrelation. Thus the fluctuations in amplitude and in propagation time observed in the signals collected by the two antennae 201 and 202 (arranged along an alignment perpendicular to the main direction of the incident waves and at a distance apart of 15 to 30 wavelengths) are in practice only very weakly correlated.

By rearranging the timing-marks detected over the two channels the fluctuation of the composite signal is weaker than that which would be observed over each channel independently because of this decorrelation. It will be observed that here a linear summation is just as suitable as a non-linear rearrangement.

(2) When a refraction or an abnormal "super-refraction" exists. In this case as has been explained previously, secondary responses may appear from the propagation medium. These secondary responses develop rather slowly in time and in space and their time of arrival is slightly shifted with respect to the "useful" or normal response from the medium and consisting of the signals proceeding from the normal tropospheric diffusion. The two responses may interfere at a given place with similar amplitudes and any possible phase combination.

When the two responses are combined in phase agreement and up to ±2 to 2.2 radians, the disturbances in amplitude and in apparent propagation time are weak. The device in accordance with the invention then operates in practice as in the absence of these disturbances (Case 1 above).

When on the contrary the main response from normal tropospheric diffusion has added to it a secondary response nearly in phase opposition (at about ±0.1 radians) the composite amplitude of the wave received decreases considerably and considerable fluctuations appear correlatively in the apparent propagation time associated with the wave thus received.

Under these conditions the device in accordance with the invention operates in the manner described in relation to FIG. 6 by retaining only the strongest signal for the automatic gain control. Thus one is sure of preserving the relative amplitudes of the high-frequency signals received. In order to feed the propagation time tracking loop the signals leaving the two channels are rearranged, weighted because of the common gain control.

In this second case the rearrangement may be linear but it is more advantageous that it be non-linear so as to diminish still more the weight associated with the weak signals.

FIG. 6 illustrates the situation at a given instant when it is the antenna 201 which is receiving the normal tropospheric diffusion signal whilst the antenna 202 is receiving the signal disturbed by a secondary response from tropospheric refraction, lying in phase opposition. In practice the situation develops permanently and may very well appear in the reverse manner.

The advantages of the device of the invention are considerable: when an abnormal refraction exists, the probability of seeing a disturbed channel and a conventional receiver caught out, may be of the order of 1/20 to 1/30 of the time; as the appearance of disturbances between the two channels is relatively little correlated, the probability of finding disturbances simultaneously on the two channels, that is to say, of obtaining poor operation of the device of the invention is about 1/400.

It has been indicated above how to determine the time constant for increase in gain in the automatic gain control chain. It is clear that the choice of this time constant contributes to the obtaining of good results with the device of the present invention. Obviously the same applies as far as the choice is concerned of the zone of non-linearity of the diode or of the analogue-OR circuit incorporated in the detector, with respect to the range of amplitude available as output from the decoder. It is in fact this zone of non-linearity and its possible threshold which will complete the weakening of the weighting carried out upon the signals of weak amplitude.

III—VARIANTS UPON TRANSMISSION OF THE TIMING-MARK

The greater the power transmitted, the better will the installations in accordance with the invention operate for enabling the receiver to distinguish the useful signal from the noise in spite of the weakening undergone by waves over long distances.

Furthermore in order to transmit a timing-mark one may, for example, produce short synchronous high-frequency pulses from a time base, which corresponds with a total amplitude modulation of the high frequency of transmission from pulses deduced from the time base.

More generally, to produce a high-frequency signal coded according to a timing-mark always necessitates a modification or modulation of the pure high-frequency wave shape. In fact as soon as a modulation has been carried out upon the latter, of known shape in time and of the same period as the time base 113, the signal thus modulated is the bearer of a repetitive timing-mark connected with this time base. Any signal of this species may be employed according to the present invention.

A known example of a code of this species is the code known as a "pulse compression" code. Usually it makes a linear excursion from the high frequency of transmission into a known frequency interval and for a known interval of time, correspond with a time base pulse. Upon decoding, a convolution filter ("matched filter") enables the reverse transformation of the signal received into time base pulses. For decoding one may likewise but less advantageously correlate the code received with a local replica of same code.

In practice the periodic modulation which represents the timing-mark is often defined by a predetermined periodic sequence of low and high logical levels. The period of the sequence is of the time base and the start of this sequence is synchronized with the time base pulses. Such a sequence may conveniently be represented by a binary number and an associated clock frequency. Furthermore such codings by binary sequence are usually accompanied by a frequency or phase modulation.

A particularly advantageous example of binary sequence codes is that of the "pseudo-random codes". In a manner known in itself such codes are obtained by means of a shift register, to the input to which a logical combination is brought back from at least two of its stages. Under certain conditions such a register provides within a finite interval of time a practically random sequence of binary digits called "pseudo-random sequence or code". With such a pseudo-random code the modulation to the transmission which is employed is very often a modulation by phase reversal. Although decoding may be effected by convolution it is more advantageous in certain applications to effect it by correlation.

A pseudo-random code is generally chosen, the duration of which is in relation to the period of the time base to be transmitted and in principle at most equal to the latter. When the number of binary elements in the code is increased at constant duration of it, its autocorrelation function becomes stronger and more selective and the transmission of the timing mark is consequently more accurate.

Although the invention is applicable whatever the mode of transmission of the timing-mark it develops its advantages much better with codes which enable a spreading in time of the energy transmitted, this having to be large in order to enable good reception at long distances. In this respect it will be observed that the binary sequence codes of duration equal to the period of the time base enable an optimum spreading of the energy transmitted; instead of short high-frequency pulses the energy is then transmitted continuously.

As regards now the accuracy of transmission of the timing-mark, the more selective the decoding is in the time, the better it will be, which has proved important for distinguishing in the best way the main response from the secondary responses. In this respect the Applicants at present prefer the following associations:

coding by pulse compression code and decoding by convolution, especially when a number of a priori unknown propagation distances must be supervised at the same time (the case of a radar incorporating both the transmitter and the receiver, and supervising an indefinite number of moving objects reflecting the waves, for example);

coding by pseudo-random code and decoding by correlation with a replica of the same code, especially when an a priori limited number of propagation distances is being tracked in a subordinate manner (the case, for example, of movable objects equipped with receivers for circular or hyperbolic radio-navigation, cooperating with two or three transmitter stations).

The foregoing considerations of the coding of a timing-mark are applicable to any of the described embodiments of the invention.

With certain methods of decoding-convolution in particular—it is not necessary to provide a connection between the controlled delay circuit 252 and the decoding circuit or circuits 212 (and 222, in case of need). That is why this connection is shown in dash-dot line on the electrical diagrams, starting from FIG. 4.

IV—APPLICATIONS OF THE INVENTIONS

Various types of application of the invention will now be examined:

(a) the time of transit of the waves is known by having been measured previously and/or because the distance from the transmitter to the receiver is known; the timing-mark from the receiver can then be synchronized with that from the transmitter.

(b) the time bases of the transmitter and the receiver are already synchronized, for example, because they are at the same place and have a common time base; one can then have access to the propagation distance by measurement of the propagation time. This is the case of the radar transmitter-receiver, the propagation path out and back of which is defined by a reflection from a fixed or movable object. It is also the case of a transmitter-receiver known as an "interrogator" working with a receiver-transmitter or "responder" which contents itself with retransmitting the timing-mark after shifting it by a whole number of periods $T_R$ (active circular radio-navigation).

(c) a main transmitter is employed and at least two fixed retransmitters like the responders above; the relative positions of these three stations are known or can be determined; a movable receiver having three reception channels associated respectively with the main transmitter and the two retransmitters can determine its position in the form of difference in distance with respect to the three stations by way of the differences in transit time (hyperbolic radio-navigation).

(d) As a corollary in Case (c), since there is available enough timing information for determining the position of the movable receiver, the transit time parameter may be eliminated and the timing mark from the movable receiver may be synchronized with that which is common to the transmitters.

Other applications exist, especially variants upon those above. Instead of differences in distance alluded to in (c) one may employ summations of distances or more generally linear combinations of distances. Furthermore without the various time bases employed being strictly synchronous they may be very stable (very good quartz or atomic clocks, for example); in cases (b) and (c) "pseudo-distances" are then measured which may be corrected after measurement of the deviations of the various time bases with respect to one of them. With time bases of average stability pseudo-distances may still be obtained which will be corrected according to the indications from correction stations equipped like the movable objects and transmitting corrections permanently or at sufficiently close intervals of time, taking into account the stability of the time bases (differential radio-navigation—circular or hyperbolic, for example).

Figure 13:
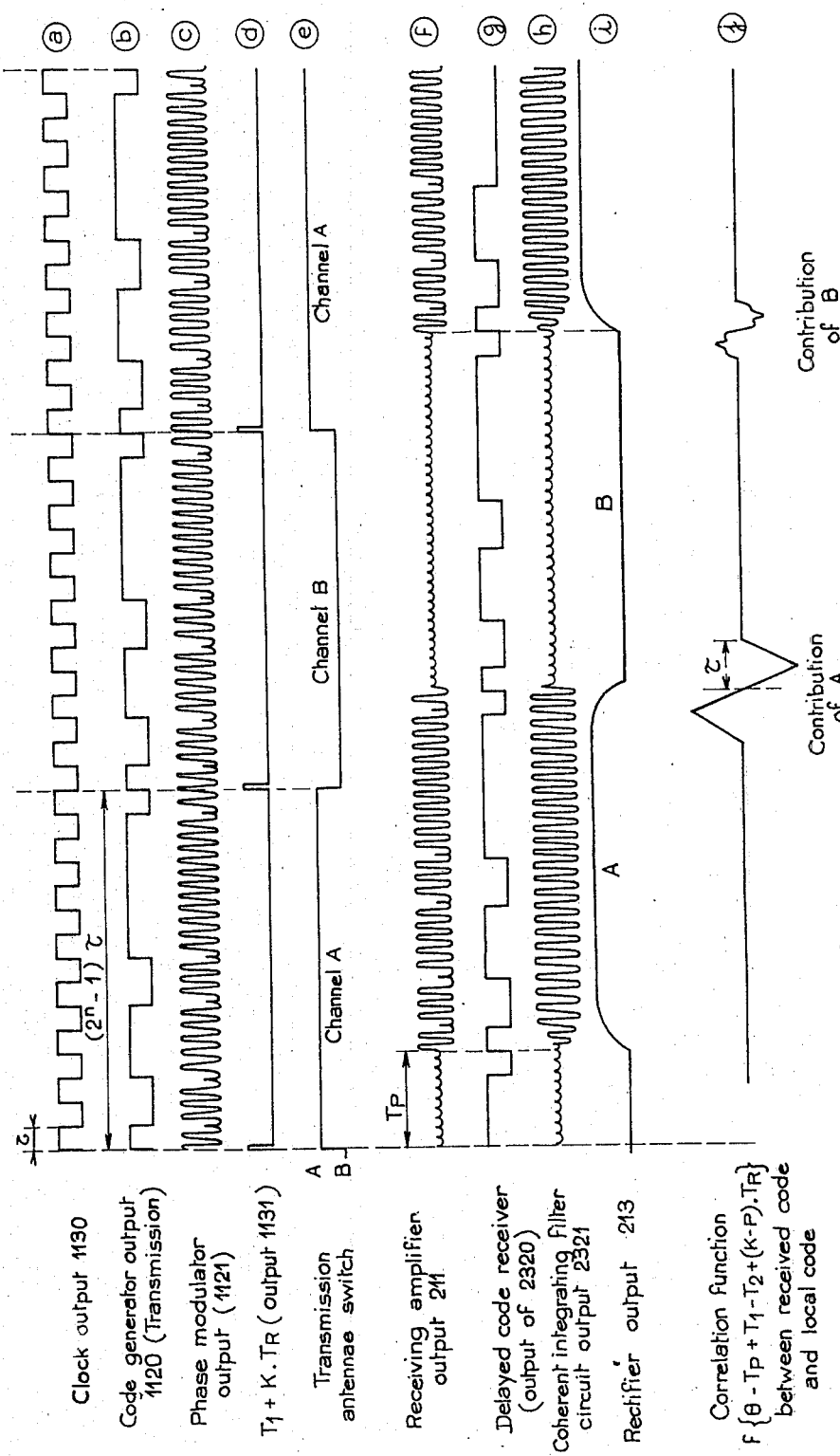
FIG. 13 illustrates wave forms relative to the embodiment as FIG. 12.

Other embodiments of the invention will now be described which differ from the first (FIG. 4) either by the method of employment of space diversity (FIGS. 7 and 9) or by the method of coding of the timing-mark (FIGS. 11, 12 and 13).

V—VARIANTS AS TO SPACE-DIVERSITY

FIGS. 7 and 8 illustrate a variant upon the first embodiment of the invention (FIGS. 4 to 6) in which instead of employing two separate reception channels between the two antennae 201 and 202 and the input to the tracking loop (circuit 254) a single channel is employed, connected in shared time to the two antennae.

For this purpose the output from the timebase 251 (FIG. 8b) is connected to a circuit 206 for dividing by two, the output signal from which (FIG. 8c) controls a switch 205. The latter alternates between two positions A and B in which it connects respectively the antennae 201 and 202 to the input to the single reception channel (211 to 213). The lengths of the connections between the antennae 201 and 202 and the switch 205 must be identical.

The high-frequency output from the transmitter is represented in FIG. 8a. It is assumed as indicated in FIG. 5 that the channel A (antenna 201) receives an undisturbed signal (FIG. 8d) whilst that from channel B (antenna 202) is disturbed, for example, by a tropospheric refraction in phase opposition (FIG. 8e). As the output from the amplifier 211 a signal is obtained which is formed alternately from the channel A and from the channel B (FIG. 8f). As the output from the detector 213, because of its non-linear characteristic, only the timing-mark signals persist which arise from the channel A.

In set-off against the alternate use of the same reception channel, the timing-mark signal is available only every other time when one of the antennae receives a disturbed signal. One skilled in the art knows that that is sufficient for making the time tracking loop function much better than if a disturbed signal were preserved in it. Of course in this variant having only one reception channel a gain control circuit (203,204) is connected between the output from the detector 213 and the variable gain amplifier 211. As previously it is equipped with a time constant in order to take into consideration only the crest values of the timing-mark signal (FIG. 8g). The period of the latter is in the presence of disturbances double that which it was in the case of FIG. 4; hence for the circuit 203 an integration time constant will be taken, which is at least equal to double the period of the time base.

The average rhythm of appearance of the timing-mark may be divided by two. Hence a time constant may be taken which is much larger than previously but not necessarily double, for the integrating filter circuits 256 of the tracking loop or at least for the first of them.

Furthermore if it happens that the output from the time base 251 is nearly in phase with the signals received, and output may be employed which is shifted by half-a-period of the time base in order to control the switch 205 through the divider 206.

In FIGS. 9 and 10 the space-diversity is achieved by two antennae 101 and 102 located at the transmission end. They are connected alternately by connections of identical lengths, to a switch 105 which receives the output from the transmitter circuit 111 (FIG. 10a). This defines one radio-electrical channel A through the antenna 101 and one channel B through the antenna 102. The state of the switch 105 (FIG. 10b) is managed by a divider by 2 (or an even number 2n) which is connected to one output from the time base 113, this output lying slightly in front of that which defines the transmission pulses.

The receiver will then receive alternately as they present themselves, the two radio-electrical channels defined by the transmitter. FIG. 10c represents the output from the amplifier 211, still in the propagation case defined by FIG. 5 where the channel A is transmitting well and the channel B is disturbed (except that in FIG. 5 the locations of the transmitter and receiver are reversed). And FIG. 10d illustrates the output from the detector 213 which it can be seen is like that of the first variant (FIG. 8g). Hence it is employed in the same way.

The receiver of FIG. 9 is the same as that of FIG. 7 with, however, only one antenna and omission of the components 205 and 206.

The considerations developed with respect to the first variant about the different time constants remain valid, taking into account the fact that the alternate reception period from the radio-electrical channels A and B may be doubled or multiplied by 2n, depending upon the choice of the divider 106 in the transmission.

As previously, the time constant is advantageously increased for the automatic gain control loop, whereas the increase of the time constants is not necessarily useful in the time tracking loop since that diminishes the maximum speed of tracking of the latter because of disturbances which are produced on the average only over 1/20 of the reception time.

This second variant embodiment exhibits a particular advantage; as the space-diversity is realized at the transmission a large number of simple receivers may profit from it (even up to a certain point, conventional receivers of the former technique).

In the space-diversity embodiments described only two antennae have been employed. Of course this number is not restrictive and three or more may be employed. The increase in the number of antennae complicates the transmitter and/or the receiver; in set-off, the probability that the installation is caught out by disturbances diminishes as the exponential of the number of antennae.

VI—VARIANTS UPON THE CODING OF THE TIMING-MARK

In what has gone before, the very simple case has been considered of the coding of a timing-mark by short synchronous high-frequency pulses from a time base. That being so, high energy must be transmitted in order to ensure good transmission very much beyond the horizon in spite of the attenuation which is undergone by the waves there. Instead of transmitting high energy in short high-frequency pulses it is more often preferable to spread out this transmitted energy by employing a more elaborate coding of the timing-mark. Such codings have been described above and are applicable to all of the embodiments of the invention. Certain examples of application of these elaborate codes will now be described.

The first example of a code concerns the installation of FIG. 9 and the wave forms which it brings into play are illustrated in FIG. 11.

At each pulse of duration $\tau$ produced by the transmission time base 113 (FIG. 11 A) the coder 112 makes a code start of duration $\tau'$ much greater than $\tau$ (FIG. 11b). In FIG. 11c is found again the alternate switching of the antennae 101 and 102 in order to define the radio-electrical channels A and B respectively. These two antennae will radiate alternately portions of signal of high-frequency (not shown) which have a duration $\tau'$ (at least), and are modulated by the code of FIG. 11b. The channel B is assumed to be disturbed, whilst the channel A is not. Hence in the receiver as the output from the amplifier 211 the transmitted signals are obtained, delayed by the propagation time $T_p$, that is, at one time the contribution from the channel A of general amplitude S, at another time the contribution from the channel B, of weaker general amplitude, S/30, for example, because of two propagation paths arriving in phase opposition at the antenna 201 of the receiver.

The code may be a priori of any kind and has not been illustrated in detail in FIG. 11. The codes at present preferred are a signal modulated linearly in frequency in a frequency interval equal to $1/\tau$ or else a signal modulated in phase by a pseudo-random sequence.

In the receiver a decoder 212 can be employed which makes pulses of duration $\tau$ (the same as at the transmission time base) correspond with the coded signal received, with a signal-to-noise ratio muliplied by $\sqrt{\tau'/\tau}$ (with reference to the signal-to-noise ratio of the high frequency received). Such a decoder gives output pulses after a delay $\theta$ which is known and which may be greater than the period $T_R$ of the timing-mark, which does not trouble the operation of the time tracking loop.

FIG. 11e illustrates the output from such a decoder. After processing by the tracking loop the signal of FIG. 11g is obtained as the output 2523 from the circuit 252. For its part the output from the time base 251 in the receiver is illustrated in FIG. 11f. And the clock 260 (FIG. 9) will now provide a time separation increased by the constant delay $\theta$ due to the decoder or $T_1+T_p+\theta-T_2+(K-P)T_R$ (FIG. 11g).

The description above, made with reference to FIGS. 9 and 11 corresponds exactly with the case of a pulse compression code at the transmission and decoding by convolution at the receiver. In this case the decoder consists of a filter matched to the particular code from the transmission. Such a matched filter effects by construction a convolution of the code, which provides a short pulse after a delay $\theta$. For the decoding, the matched filter does not necessarily need to know the timing-mark onto which the time tracking loop is adjusted. Hence in certain cases the connection in dash-dot line between the circuits 252 and 212 disappears. With this reservation, the general diagram remains that as FIG. 9. Of course with other types of space-diversity connections the diagram of the installation would be that of FIG. 4 or of FIG. 7.

For the decoding, instead of carrying out a convolution one may proceed by correlation of the code received with a replica of the same code generated locally in the receiver with respect to the timing-mark upon which the tracking loop is adjusted. The principles developed above with respect to the coding remain in general valid but the diagram for realization often becomes more complicated, because it is preferable to overlap the time discrimination function of the tracking loop and the correlation function of the decoder.

With reference to FIGS. 12 and 13, a particular embodiment will now be described with decoding by correlation, for a coding consisting in modulating high-frequency signal trains by phase reversals according to a pseudo-random sequence. The space-diversity connection is effected as in FIG. 9 (or as a variant as in FIGS. 4 or 7).

At the transmission end the clock 1130 now defines a frequency $f=1/\tau$ (13a) where $\tau$ is a sub-multiple of the period $T_R$. This clock 1130 feeds a pseudo-random code generator 1120 consisting of a shift register of n stages, the input to which is fed by a logical combination from at least two of its intermediate stages. In such cases $\tau$ must satisfy the relationship $T_R=(2^n-1).\tau$. The logical combination in question or else any one chosen in advance, of the stages of the register 1120 (FIG. 13b) feeds a phase modulator 1121 which produces a signal intended for the transmission and modulated in phase according to the output from the pseudo-random code generator (FIG. 13c). It will be assumed here that it is a question of modulation by phase reversal. Otherwise modulation may be effected over a signal of intermediate frequency which a change in frequency then brings to the transmission frequency.

It has previously been seen that the clock 1130 operates at a period $\tau$ which is a sub-multiple of that $T_R$ of the time base. A divider of frequency by $2^n-1$, designated by 1131, restores the time base $T_1+K.T_R$ (FIG. 13d). As in FIG. 9 this feeds the remainder of the transmitter device, in particular the switching of the antennae 101 and 102 (FIG. 13e). In practice instead of a divider by $2^n-1$, decoding of the content of the register 1120 may be employed.

At the receiving end as at the transmission end is found a clock 251 but of frequency $2/\tau$. The controlled delay circuit 252 now acts upon the output from this clock and in response to the signal delivered by the integrating filter circuits 256.

The output from the delay circuit 252 is divided by two (in frequency), which restores the frequency $1/\tau$ of the transmission, which is then applied to a pseudo-random code generator 2511 like that in the transmission.

The output from the receiver amplifier 211 (FIG. 13f) is applied to a decoder circuit 212 consisting first of all of a modulator by phase reversal 2120 controlled by the code output from the code generator 2511 (FIG. 13g), and then of a coherent integrating filter circuit 2121 (output illustrated in FIG. 13h). The latter consists, for example, of an L-C filter tuned to its input frequency, the time constant of which is preferably at least equal to $T_R$. In practice because of the wide separation between the frequency of the carrier signal and that ($1/T_R$) of the timing-marks, one or more frequency changes are advantageously employed before decoding (this is valid also with other types of coding, in particular with pulse compression codes).

As far as the automatic gain control is concerned there is found again as in FIG. 9 a rectifier circuit 213, preferably non-linear, the output from which (FIG. 13i) controls the circuit 203 and 204 (this rectifier includes in practice a filter circuit).

On the other hand the time discrimination is different from that as FIG. 9. In the present case the output from the delay circuit 252 of frequency $2/\tau$ controls another modulator by phase reversal 2320 which receives at its input the output from the first modulator 2120. Its output is applied to another coherent integrating filter circuit 2321. Finally a multiplier 254 multiplies the outputs from the two coherent integrating filters 2121 and 2321. Preferably the multiplier 254 provides the non-linear characteristic suitable for favouring the stronger signals. One skilled in the art will understand that the output from the multiplier 254 represents the time separations between the local timing-mark and the timing-mark received, just as the discriminator 254 in FIG. 9 did. After that the output from the circuit 254 feeds the integrating filter circuits 256 of the time tracking loop which in turn adjusts the delay $\theta$ in the delay circuit 252.

In FIG. 13f it appears that the channel A is giving a strong signal S whilst the channel B is giving a disturbed signal of distinctly weaker amplitude, S/30, for example. This state of things is found again at the output from the filter 2121 (FIG. 13h). The rectified signal (13i), given by the rectifier circuit 213 is much stronger during the timing segments associated with the channel A. Hence the automatic gain control as in the other embodiments is sensitive above all to the undisturbed signal from this channel.

As far as the time tracking is concerned, the output from the multiplier 254 is connected with the function of correlation of the code received and the local code. This correlation function is represented in FIG. 13j. It may be seen that it is much stronger for the channel A than for channel B. One skilled in the art will understand that the time tracking loop then reacts essentially to the undisturbed signals from the channel A.

Thus the local pseudo-random code generator circuit 2511 contains the timing mark received. It may be found again in the time base form $T_1+T_p+K.T_R$ by carrying out a predetermined decoding of the different stages of the shift register incorporated in the code generator 2511.

A local timing-mark may be defined in the same way: another pseudo-random code generator 261 like the first one 2511 is connected to the output from the clock 251 across the divider of frequency by two 262; the same decoding is carried out on the code generator 261 as on the first one 2511, which gives the timing-mark local to the receiver, $T_2+P.T_R$. Finally, as previously, a clock 260 measures the separation between the two timing-marks. Of course numerous variants exists as to the way of employing the timing-mark received as contained in the code generator 2511.

VI—EXAMPLES OF PREFERRED APPLICATIONS

The invention is capable of numerous applications already enumerated. Amongst these the measurement of propagation time and the measurement of distance are important. A number of examples will now be described by reference to FIGS. 14 to 16. These applications involve connections out and back between two points or redundant connections between more than two points, which enable the unknowns to be eliminated from the time bases (the instants $T_1$ and $T_2$).

Figure 14:
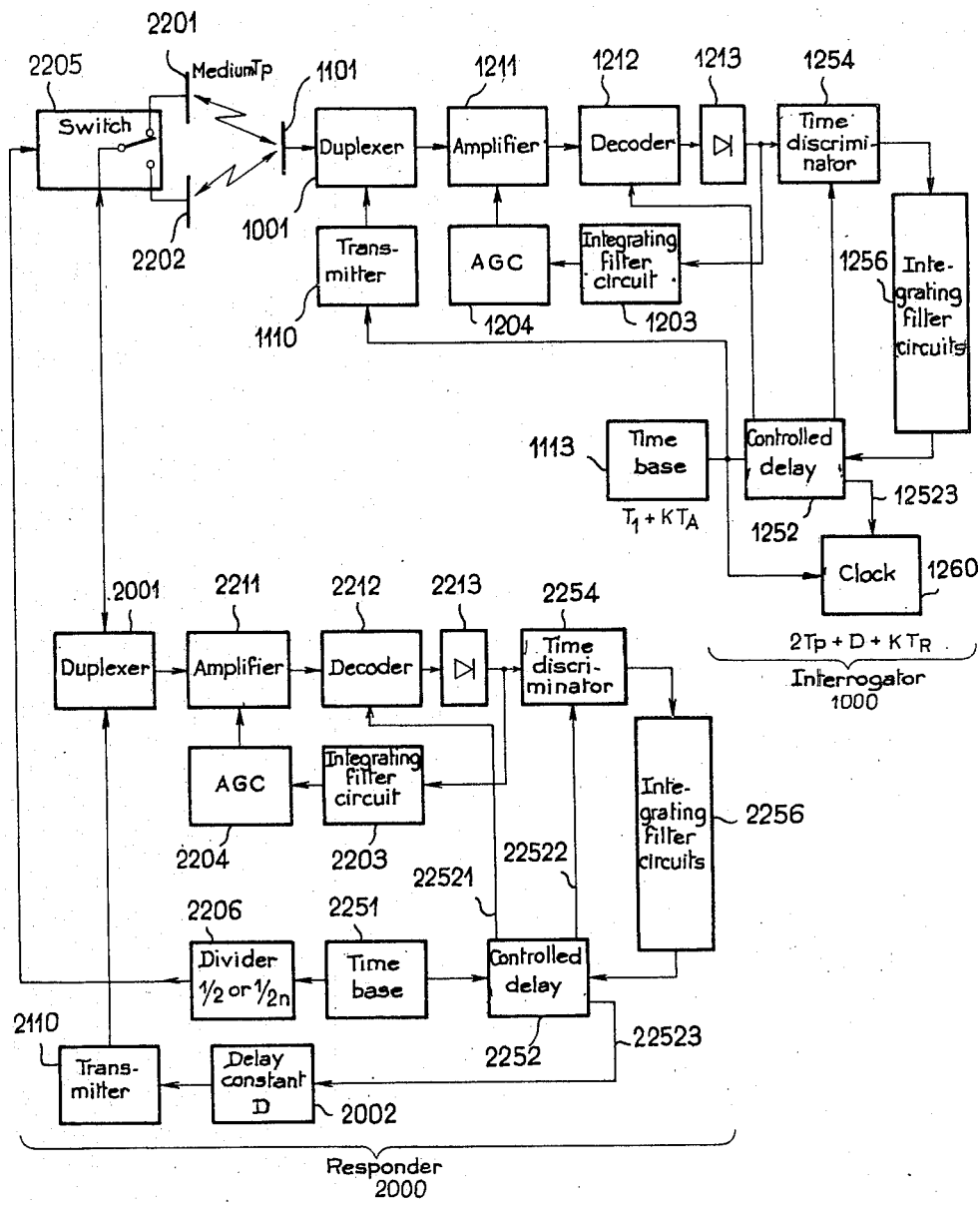
FIG. 14 illustrates an application of the invention to the measurement of the distance between an interrogator and a responder.

FIG. 14 illustrates a connection out and back between an interrogator 1000 and a responder 2000.

The interrogator 1000 includes a transmission time base 1113 the timing-mark of which is $T_1+K.T_R$. It is connected to a transmission circuit 1110 which combines the functions of coding (112, FIG. 7) and amplification of transmission (111, FIG. 7). A duplexer 1001 couples the output from the transmission circuit 1110 to the sole transmission antenna 1101. (It will be observed that by removing the thousands digit the numerical references of components already described are often found again; in what follows they will not all be described in detail again). These circuits of the interrogator 1000 effect the transmission as for FIG. 7.

For its part the responder 2000 also includes circuits like those in FIG. 7. Two antennae 2201 and 2202 are connected alternately by a switch 2205 to a duplexer 2001. The latter feeds in particular a receiving unit like that in FIG. 7 (components 2203 and 2204, 2211 to 2213 and 2251 to 2256).

Instead of being applied to a clock, the output 22523 from the circuit 2252 feeds in its turn a transmitter unit 2110 (like 1110), if necessary through a circuit 2002 which defines a constant delay D. The transmitter 2110 is also coupled to the duplexer 2001 in order to feed the antennae 2201 and 2202 alternately through the switch 2205 controlled by the divider 2206 from the time base 2251.

Thus the timing-mark received by the responder 2000 (output 22523 from 2252) is sent by its transmitter 2110.

Between the latter and a receiving unit incorporated in the interrogator 1000 the antennae 2201 and 2202 (now transmission) and the antenna 2101 (now reception) define a space-diversity connection, this time as in FIG. 9.

Thus in the interrogator 1000 the duplexer 1001 connects the antenna to a receiving unit as in FIG. 9. The receiving unit includes the receiving chain 1211 to 1213, the automatic gain control loop 1203 and 1204, and the time tracking loop 1252, 1254 and 1256. The timing-mark output 12523 from the circuit 1252 provides the timing-mark initially transmitted, delayed by twice the propagation time $T_p$, by the possible delay D due to the circuit 2002 in the responder and small delays which are known, due to the circuits themselves.

A clock 1260 measures the time separation between the output 12523 and the origin time base 1113. From it in known manner is deducted the propagation time $T_p$, with an ambiguity equal to the period $T_R$ of this time base. This ambiguity may be removed at least partially by means of techniques which are likewise known.

In practice the transmission out between the interrogator 1000 and the responder 2000 and the transmission back between the responder 2000 and the interrogator 1000 are carried out over different high carrier frequencies or else in shared time over the same carrier frequency under the control of their respective time bases 1113 and 2251. In the latter case a delay D sufficient for the response is employed by means of the circuit 2002.

Such a connection out and back may be made general to a number of responders as shown in FIG. 15 where responders R1,R2,R3, . . . Rn may be distinguished, built in the same way as the responders 2000 in FIG. 14. In order to simplify the drawing only the two antennae and the switch associated with each responder are illustrated. By $T_{p1}$, $T_{p2}$, $T_{p3}$ . . . $T_{pn}$ are designated the respective propagation times of the waves between the responders R1,R2,R3, . . . Rn and the interrogator 1000.

For its part the interrogator formed as in FIG. 14 with, however, certain components repeated n times.

The time base 1113 is connected (connection not shown) to the transmitter 1110 coupled to the antennae 1101 through the duplexer 1001. For reception the latter connects the antenna to the receiver amplifier 1211 which is associated with its automatic gain control 1204.

On the other hand a register 1800 connected to the time base 1113 produces n reception control signals separated in time, designated by X1 to Xn; the signals X1 to Xn define n reception time spans assigned respectively to the n responders for the interrogation and the response of each of them. For example, between the instant O and the instant $T_R$ the responders R1 is interrogated; from $T_R$ to $2.T_R$ it is R2 and so on until the last one Rn between the instant $(n-1).T_R$ and $n.T_R$. The cycle is then repeated periodically. Recognition by the various "responder" stations of the interrogations which are particularly assigned to them may be realized by well known means of synchronization or coding.

Hence the "receiving" portion of the interrogator 1000 is sub-divided after the amplifier 1211 into n channels assigned respectively to the n responders. Each channel includes the decoder 1212 followed by the non-linear circuit 1213. The output from the latter is applied to the integrating filter circuit 1203 as well as to the time discriminator 1254 which forms the tracking loop with its integrating filters 1256 and the controlled delay circuit 1252 connected to the time base 1113. Finally in each channel a switch such as 1801 fed by the signal X1 for the channel 1 blocks the delay circuit 1252 outside the signal X1, that is to say, outside the moments when the channel 1 is cooperating with the responder R1.

All of the automatic gain control integrating filter circuits such as 1203 are connected by a series of switches (reacting to the signals X1 to Xn) to the input to the circuit 1204. Otherwise when it is not blocked (hence X1 . . . Xn in turn) each delay circuit such as 1252 applies its output to the clock 1260 which compares it with the time base 1113. As previously indicated the time separation measured each time by the clock is representative of the values $2.T_{p1}, 2.T_{p2}, \ldots 2.T_{pn}$, during the successive moments X1, . . . Xn. A final set of switches brings the values measured to a series of storage registers such as 1811.

The circuits which have just been described are capable of numerous variants, in particular as to the realization of the multiplexed channels associated with each of the responders.

The positions of the n responders being known, the interrogator determines the n transit times towards them, hence its distance with respect to each responder and thereby its position. (Active circular radio-navigation).

FIG. 16 illustrates another example of application. The transmitter Eo is that having two antennae as FIG. 9. Responders R1 to Rn likewise having two antennae respond to this transmitter each in turn as for FIG. 15. Their signals are collected by a pure receiving station RP like the interrogator 1000 in FIG. 15 but without the transmitter 1110 or, consequently, the duplexer 1001. The transmitter and responders are fixed (or have known positions). Hence the transit times of the waves between Eo and R1,R2, . . . Rn are known, which are written C1,C2, . . . Cn.

The timing-mark of Eo is $T_o + K.T_R$. The responder in row i, written $R_i$, retransmits a timing-mark $T_o + C_i + K'T_R$ (except for known constants).

The clock 1260 in the pure receiver RP will make time measurements with respect to the local mark $T_1 + K''T_R$ defined by the time base 1113.

The factors such as $KT_R$ can be eliminated by known techniques for removing ambiguity. The same applies for all of the known constant terms ($C_i$; delays in the circuits). The responders themselves are usually arranged in order to correct the timing-mark which they retransmit in order that it may be exactly $T_o(+K'T_R)$.

Hence in the registers connected to the output from the clock 1260 will be found $T_{po} + T_o - T$ (register 1811), $T_{p1} + T_o - T_1$, $T_{p2} + T_o - T_1$, . . . $T_{pn} + T_o - T_1$. The receiver RP has not in general available the timing mark $T_o$ employed by the transmitter Eo and the fixed responder R1 . . . Rn. In this case, by forming the difference between the contents of the registers, $T_o - T_1$ disappears and one obtains $T_{po} - T_{p1}$, $T_{po} - T_{p2}$ and all of the differences of the same species. These differences in propagation time correspond with differences in distances of the receiver RP with respect to the stations Eo, R1, R2 . . . Rn. The receiver RP can determine its position by intersection of networks of hyperbolic position lines (hyperbolic radio-navigation).

The applications of the invention to measurements of distances and/or propagation times are particularly advantageous, especially those which have just been described. The invention in short for the first time enables terrestrial connections to be employed for this purpose over long distances (transhorizon), which benefit from the accuracy allowed by waves of short wavelength (higher than 30 MHz or better 100 MHz, that is to say, metric, decimetric, or centimetric waves). Decimetric waves—frequencies of the order of 400 MHz—are at present preferred.

FIGS. 14 to 16 illustrate simple cases, non-restrictively. Thus the stations called fixed may, for example, be moved provided that their positions are known to the moving object which is determining its position (during or after the measurements). Any of the variants of application mentioned after the first embodiment (Section IV) may be made general with the examples as FIGS. 14 to 16.

The same applies for any of the variants upon coded transmission previously described, especially in Section III as well as with reference to FIGS. 9 and 11 combined and 12 and 13 combined.

Thus, for example, instead of exploiting the installation as FIG. 16 in the hyperbolic mode the position of the receiver RP may be determined by solving the matrix equation of the n measurements contained in the registers such as 1811 (determination of two-dimensional position coordinates by the method of "pseudo-distances"). This method yields as a supplementary result the separation between the original timing-mark $T_o(+KT_R)$ and the local timing-mark $T_1(+K''.T_R)$, as soon as there are at least 3 stations available. This time separation is known with an accuracy which depends upon the validity that may statistically be granted to each measurement. Knowing this time separation, the receiver RP can then reconstitute a local timing mark which is synchronous with the original mark.

The present invention by enabling satisfactory transmission very much beyond the horizon, of a timing-mark, considerably enriches the possibilities of measurement of propagation time and/or of distance, and more generally the possibilities of terrestrial transmission (ground-to-ground) of time information.

What is claimed is:

1. A system for the radio-electrical transmission of a high-frequency signal carrying a timing-mark, comprising:
    (a) transmitter circuit means for generating a first high-frequency electrical signal carrying a basic timing-mark which is predetermined and repetitive;
    (b) a first antenna station coupled to said transmitter circuit means for transmitting waves corresponding to said first high-frequency electrical signal carrying said basic timing-mark;
    (c) a second antenna station remote from said first antenna station, one of said first and second antenna stations having at least two spaced-apart antennae so as to define at least two different propagation paths for high-frequency waves between said first and second antenna stations, said second antenna station comprising means for receiving said transmitted waves carrying said basic timing-mark after travel thereof over said at least two different propagation paths, and for delivering corresponding high-frequency electrical signals which carry received timing-marks, said received timing-marks being the same as said basic timing-mark but being shifted in time with respect to said basic timing-mark in dependence upon the travelling time of the waves over each of said different propagation paths; and
    (d) receiver circuit means coupled to said second antenna station for obtaining the received high-frequency electrical signals therefrom, said receiver circuit means comprising non-coherent combining means for
        (1) separately decoding, for each of the different propagation paths, the corresponding received high-frequency electrical signals carrying the timing-marks which are delivered by the second antenna station,
        (2) rectifying the separately decoded high-frequency electrical signals carrying the timing-marks in order to recover said timing-marks, and
        (3) non-coherently combining together the recovered said timing-marks into a composite timing-mark,
    whereby said composite timing-mark is more closely related to the travelling time of the waves between said first and second antenna stations than each of the recovered timing-marks individually.

2. The system of claim 1, wherein said receiver circuit means is further operative for weighting the recovered timing-marks according to respective weights related to the level of high-frequency signal reception over the propagation paths from which the recovered timing-marks arise, prior to said step of non-coherently combining the recovered timing-marks.

3. The system of claim 2, wherein said receiver circuit means includes
    a circuit for variable-gain amplification of the received high-frequency electrical signals from the second antenna station, and
    gain control means for defining the variable gain of said circuit in accordance with the peak amplitude of the composite timing-mark signal,
    whereby the recovered timing-marks are weighted as a function of the level of the respective high-frequency signals from which they have arisen, and thus according to the respective propagation path travelled.

4. The system of claim 3, wherein said gain control means has a predetermined time constant which is greater than the average interval of time for self-correlation of the anomalies observable in transhorizon propagation.

5. The system of claim 4, wherein said gain control means comprises an electrically non-linear member located downstream of the variable-gain amplification circuit, the variable gain being dependent upon the output from said non-linear member.

6. The system of claim 1, wherein the transmitter circuit means comprises:
    a transmission amplifier circuit coupled to the first antenna station,
    a time base circuit, and
    a coder circuit connected to the time base circuit for establishing from the time base the high-frequency signal carrying said basic timing-mark, and applying the same to said transmission amplifier circuit.

7. The system of claim 1, wherein the receiver circuit means further includes:
    a receiving amplifier circuit coupled to the second antenna station for amplifying the received high-frequency signals carrying the timing-marks, said non-coherent combining means being coupled to an output of said receiving amplifier circuit,
    a time base circuit for defining a local timing-mark, a variable delay circuit connected to the time base circuit for applying a variable delay to the local timing-mark, and a correcting circuit which responds to an output of the non-coherent combining means by controlling the variable delay circuit such that the delayed local timing-mark coincides with the composite timing-mark, the delay so controlled being related to the propagation time of the waves from the first antenna station to the second antenna station.

8. The system of claim 7, wherein the transmitter circuit means produces said first high-frequency electrical signal in the form of signal trains having a known distribution in time, the receiver circuit means receives said signal trains delayed by the propagation time of the waves over said propagation paths, and the receiver circuit means includes means for authorizing said decoding only during time intervals which have the same distribution in time as the transmitted signal trains and which are located in time according to an output of said delay circuit.

9. The system of claim 7, wherein the correcting circuit comprises a time discriminator circuit coupled to receive the composite timing-mark from the non-coherent combining means and to receive the delayed local timing-mark from the variable delay circuit, for providing an output representing a time difference between the composite timing-mark and the local timing-mark, and a time-constant circuit responsive to the time discriminator circuit output for controlling the variable delay circuit in dependence upon said time difference.

10. The system of claim 7, wherein the transmitter circuit means produces short, high-frequency, high-energy pulses, the timing-mark being defined by said pulses, and the receiver circuit means includes a switch for decoding said pulses, said switch being normally open and being closed during time intervals determined by an output of the variable delay circuit.

11. The system of claim 7, wherein the transmitter circuit means produces signal trains of high frequency modulated by a predetermined code, the timing-mark being defined by said code, and the receiver circuit means includes means for decoding the received high-frequency signal trains during intervals of time determined by an output of the delay circuit.

12. The system of claim 11, wherein said predetermined code is a pulse compression code, and the decoding is effected by an operation of convolution or correlation.

13. The system of claim 11, wherein said predetermined code is a pseudo-random code, and the decoding is effected by an operation of convolution or correlation.

14. The system of claim 1, wherein the antenna station having at least two antennae is said second antenna station, and wherein said receiver circuit means includes a respective channel to which each antenna of said second antenna station is coupled, each channel of said receiver circuit means comprising in series:

a receiving amplifier circuit, and a timing-mark decoder circuit forming a part of said non-coherent combining means, the outputs of said timing-mark decoder circuits being combined to form the composite timing-mark.

15. The system of claim 1, wherein the antenna station having at least two antennae is said second antenna station, the antennae of said second antenna station being coupled to the receiver conduit means, and wherein the receiver circuit means comprises:

a single receiving amplifier, means for alternately connecting said antennae to an input of the receiving amplifier, and a timing-mark decoder circuit forming a part of said non-coherent combining means and having an input coupled to the receiving amplifier and an output which provides the composite timing-mark.

16. The system of claim 1, wherein the antenna station having at least two antennae is said first antenna station, said transmitter circuit comprises means for alternately supplying said first high-frequency signal carrying the basic timing-mark to said antennae, and said receiver circuit means comprises a single channel including:

a receiving amplifier circuit, and a timing-mark decoder circuit forming a part of said non-coherent combining means and having an input coupled to the receiving amplifier and an output which provides the composite timing-mark.

17. The system of claim 1, further comprising second transmitter means, coupled to said receiver circuit means and to said second antenna station, for elaborating and supplying to said second antenna station a second high-frequency electrical signal carrying a second timing-mark, said second timing-mark being formed by said composite timing-mark from said receiver circuit means, whereby said second antenna station transmits and said first antenna station receives waves travelling over said at least two different propagation paths and corresponding to said second high-frequency electrical signal carrying said second timing-mark.

18. The system of claim 17, further comprising second receiver circuit means coupled to said first-mentioned transmitter circuit means and to said first antenna station for obtaining the received second high-frequency signals from said first antenna station, said second receiver means comprising non-coherent combining means for (1) separately decoding, for each of the different propagation paths, the corresponding received second high-frequency electrical signals carrying the second timing-marks which are delivered by the first antenna station, (2) rectifying the separately decoded second high-frequency electrical signals in order to recover said second timing-marks, and (3) non-coherently combining together the recovered second timing-marks into a second composite timing-mark, whereby the phase shift between said second composite timing-mark and said basic timing-mark represents twice the propagation time of the waves between the first and second antenna stations.

19. The system of claim 17, further comprising:

(a) a third antenna station remote from and operative for recovering the waves transmitted from said first and second transmitter stations, the third antenna station receiving waves from said first antenna station over at least two different propagation paths and receiving waves from said second antenna station over at least two propagation paths, and (b) second receiver circuit means coupled to said third antenna station for obtaining received high-frequency signals carrying timing-marks therefrom, said second receiver circuit means comprising non-coherent combining means for
 (1) separately decoding, for each of the different propagation paths to said third antenna station, the high-frequency signals delivered from the third antenna station and carrying timing-marks,
 (2) rectifying the separately decoded high-frequency electrical signals delivered from the third antenna station and carrying timing-marks in order to recover the timing-marks therefrom,
 (3) non-coherently combining together the timing-marks recovered from waves received from said first antenna station into a second composite timing-mark, and
 (4) non-coherently combining together the timing-marks recovered from the waves received from said second antenna station into a third composite timing-mark, whereby the time separation between said second and third composite timing-marks is related to the difference in distance between the third antenna station and the first and second antenna stations, respectively.

20. The system of claim 1, wherein the distance between said two-spaced apart antennae is between about 15 and about 30 wavelengths of the waves corresponding to said first high-frequency signal.

21. The system of claim 1, wherein said transmitted waves corresponding to said first high-frequency signal have a frequency higher than about 30 MHz, preferably higher than about 100 MHz.

22. The system of claim 1, wherein said transmitted waves corresponding to said first high-frequency signal have a frequency between about 300 MHz and about 3000 MHz.

* * * * *